US011040523B2

(12) United States Patent
Ruiz et al.

(10) Patent No.: US 11,040,523 B2
(45) Date of Patent: Jun. 22, 2021

(54) BLOWN FILMS WITH IMPROVED PROPERTIES

(71) Applicant: Dow Global Technologies LLC, Midland, MI (US)

(72) Inventors: Jose Eduardo Ruiz, Sugarland, TX (US); Fawzi G. Hamad, Pearland, TX (US); Mustafa Bilgen, Manvel, TX (US); Claudia Hernandez, Lake Jackson, TX (US); Swapnil B. Chandak, Pearland, TX (US); Jason C. Brodil, Rosharon, TX (US)

(73) Assignee: Dow Global Technologies LLC, Midland, MI (US)

( * ) Notice: Subject to any disclaimer, the term of this patent is extended or adjusted under 35 U.S.C. 154(b) by 140 days.

(21) Appl. No.: 16/324,014

(22) PCT Filed: Aug. 30, 2017

(86) PCT No.: PCT/US2017/049248
§ 371 (c)(1),
(2) Date: Feb. 7, 2019

(87) PCT Pub. No.: WO2018/063693
PCT Pub. Date: Apr. 5, 2018

(65) Prior Publication Data
US 2019/0210340 A1 Jul. 11, 2019

Related U.S. Application Data

(60) Provisional application No. 62/400,844, filed on Sep. 28, 2016.

(51) Int. Cl.
B32B 27/32 (2006.01)
C08F 210/16 (2006.01)
C08L 23/08 (2006.01)
C08F 4/655 (2006.01)
C08F 4/658 (2006.01)
C08F 4/64 (2006.01)
B32B 1/08 (2006.01)
B32B 27/08 (2006.01)
C08J 5/18 (2006.01)

(52) U.S. Cl.
CPC ............... B32B 27/32 (2013.01); B32B 1/08 (2013.01); B32B 27/08 (2013.01); C08F 4/64193 (2013.01); C08F 4/6555 (2013.01); C08F 4/6585 (2013.01); C08F 210/16 (2013.01); C08J 5/18 (2013.01); C08L 23/0815 (2013.01); B32B 2250/03 (2013.01); B32B 2250/242 (2013.01); B32B 2307/30 (2013.01); B32B 2307/40 (2013.01); B32B 2307/406 (2013.01); B32B 2307/412 (2013.01); B32B 2307/50 (2013.01); B32B 2307/72 (2013.01); B32B 2307/736 (2013.01); B32B 2439/46 (2013.01); B32B 2553/00 (2013.01); C08F 2410/03 (2013.01); C08F 2410/04 (2013.01); C08J 2323/08 (2013.01); C08J 2423/08 (2013.01); C08L 2203/16 (2013.01)

(58) Field of Classification Search
CPC .......... B32B 27/32; B32B 1/08; B32B 27/08; B32B 2250/03; B32B 2250/242; B32B 2307/406; B32B 2307/72; B32B 2307/736; B32B 2553/00; B32B 2307/412; B32B 2307/30; B32B 2307/40; B32B 2307/50; B32B 2439/46; C08F 210/16; C08F 4/6555; C08F 4/6585; C08F 4/64193; C08F 2410/04; C08F 2410/03; C08L 23/0815; C08L 2203/16; C08J 5/18; C08J 2323/08; C08J 2423/08
See application file for complete search history.

(56) References Cited

U.S. PATENT DOCUMENTS 4,314,912 A   2/1982  Lowery, Jr. et al.
4,547,475 A  10/1985  Glass et al.
4,612,300 A   9/1986  Coleman, III
(Continued)

FOREIGN PATENT DOCUMENTS

WO      199303093        2/1993
WO      2015157939      10/2015
WO   2015/200743 A1 †  12/2015

OTHER PUBLICATIONS

Busico, Vincenzo, "H NMR Analysis of Chain Unsaturations in Ethylene/1-Octene Copolymers Prepared with Metallocene Catalysts at High Temperature," Macromolecules, 2005, p. 6988-6996, vol. 38.
Karjala, Teresa P., et. al., "Detection of Low Levels of Long-chain Branching in Polyolefins," Annual Technical Conference—Society of Plastics Engineers, 2008, p. 887-891, No. 66th.
Monrabal, B., et. al., "Crystallization Elution Fractionation. A New Separation Process for Polyolefin Resins," Macromol. Symp., 2007, p. 71-79, vol. 257.

(Continued)

Primary Examiner — Michael C Miggins
(74) Attorney, Agent, or Firm — Jacob R. Graham

(57) ABSTRACT

A multilayer blown film having an inner layer, a first outer layer, and a second outer layer, wherein the inner layer comprises an ethylene-based polymer having a MWCDI value greater than 0.9, and a melt index ratio (I10/I2) that meets the following equation: $I10/I2 \geq 7.0 - 1.2 \times \log(I2)$; and the first outer layer and the second outer layer independently comprise a polyethylene composition which comprises the reaction product of ethylene and, optionally, one or more alpha olefin comonomers, wherein the polyethylene composition is characterized by the following properties: (a) a melt index, $I_2$, of from 0.1 to 2.0 g/10 min; (b) a density of from 0.910 to 0.930 g/cc; (c) a melt flow ratio, $I_{10}/I_2$, of from 6.0 to 7.6; and (d) a molecular weight distribution, (Mw/Mn) of from 2.5 to 4.0.

12 Claims, No Drawings

(56) References Cited

U.S. PATENT DOCUMENTS

| | | |
|---|---|---|
| 5,064,802 A | 11/1991 | Stevens et al. |
| 5,153,157 A | 10/1992 | Hlatky et al. |
| 5,292,845 A | 3/1994 | Kawasaki et al. |
| 5,296,433 A | 3/1994 | Siedle et al. |
| 5,321,106 A | 6/1994 | LaPointe |
| 5,350,723 A | 9/1994 | Neithamer et al. |
| 5,425,872 A | 6/1995 | Devore et al. |
| 5,625,087 A | 4/1997 | Devore et al. |
| 5,721,185 A | 2/1998 | LaPointe et al. |
| 5,783,512 A | 7/1998 | Jacobsen et al. |
| 5,883,204 A | 3/1999 | Spencer et al. |
| 5,919,983 A | 7/1999 | Rosen et al. |
| 5,977,251 A | 11/1999 | Kao et al. |
| 6,103,657 A | 8/2000 | Murray |
| 6,515,155 B1 | 2/2003 | Klosin et al. |
| 6,521,338 B1 | 2/2003 | Maka |
| 6,696,379 B1 | 2/2004 | Carnahan et al. |
| 7,163,907 B1 | 1/2007 | Canich et al. |
| 7,498,282 B2 | 3/2009 | Patel et al. |
| 8,372,931 B2 | 2/2013 | Hermel-Davidock et al. |
| 2014/0080970 A1 † | 3/2014 | Desjardins |
| 2016/0108150 A1 | 4/2016 | Desjardins et al. |

OTHER PUBLICATIONS

Randall, James C., "A Review of High Resolution Liquid Carbon Nuclear Magnetic Resonance Characterizations of Ethylene-Based Polymers," Macromol. Chem. Phys., 1989, p. 201-317, vol. C29, No. 2 & 3.

Williams, T., et. al., "The Construction of a Polyethylene Calibration Curve for Gel Permeation Chromatography Using Polystyrene Fractions," Polymer Letters, 1968, p. 621-624, vol. 6.

PCT/US2017/049248, Search Report and Written Opinion dated Dec. 6, 2017.

PCT/US2017/049248, International Preliminary Report on Patentability dated Apr. 2, 2019.

Johnson, Matthew B., et al. "Optical Properties of Blown and Cast Polyethylene Films: Surface Versus Bulk Structural Considerations." J. Applied Polymer Science, vol. 77, pp. 2845-2864 (2000).†

† cited by third party

BLOWN FILMS WITH IMPROVED PROPERTIES

TECHNICAL FIELD

Embodiments of the present disclosure generally relate to blown films and applications of the blown films to make articles, such as, shrink films, flat surface protection films, bags, laminates and laminated pouches. In particular, this disclosure relates to blown films having improved properties and articles thereof.

BACKGROUND

Polyethylene films are widely used in packaging, such as, for example, bag applications and pouches. In some instances, the polyethylene films may have high total haze values, such as, above 15% for a 1 mil monolayer blown film. Such high haze values may limit the ability of those films to be used in clear film applications, such as, bags with see through windows, surface protection films with see through optics, and high optics shrink films.

Accordingly, alternative blown polyethylene films having improved optics, such as, low haze values and high gloss, while ensuring good stiffness properties may be desired.

SUMMARY

Disclosed in embodiments herein are multilayer blown films. The multilayer blown films have an inner layer, a first outer layer, and a second outer layer, wherein: the inner layer comprises an ethylene-based composition comprising at least one ethylene-based polymer, wherein the ethylene-based composition has a Molecular Weighted Comonomer Distribution Index (MWCDI) value greater than 0.9, and a melt index ratio (I10/I2) that meets the following equation: I10/I2≥7.0−1.2×log (I2); and the first outer layer and the second outer layer independently comprise a polyethylene composition which comprises the reaction product of ethylene and, optionally, one or more alpha olefin comonomers, wherein the polyethylene composition is characterized by the following properties: (a) a melt index, $I_2$, of from 0.1 to 2.0 g/10 min; (b) a density of from 0.910 to 0.930 g/cc; (c) a melt flow ratio, $I_{10}/I_2$, of from 6.0 to 7.6; and (d) a molecular weight distribution, (Mw/Mn) of from 2.5 to 4.0.

Additional features and advantages of the embodiments will be set forth in the detailed description which follows, and in part will be readily apparent to those skilled in the art from that description or recognized by practicing the embodiments described herein, including the detailed description which follows, the claims. It is to be understood that both the foregoing and the following description describe various embodiments and are intended to provide an overview or framework for understanding the nature and character of the claimed subject matter. The description serves to explain the principles and operations of the claimed subject matter.

DETAILED DESCRIPTION

Reference will now be made in detail to embodiments of multilayer films and materials used to make such films. The multilayer blown films may be used in packaging applications. It is noted, however, that this is merely an illustrative implementation of the embodiments disclosed herein. The embodiments are applicable to other technologies that are susceptible to similar problems as those discussed above. For example, the multilayer blown films described herein may be used as surface protection films, agricultural films, such as silage wrap, laminates, or in other flexible packaging applications, such as, shrink films, heavy duty shipping sacks, liners, sacks, stand-up pouches, detergent pouches, sachets, etc., all of which are within the purview of the present embodiments.

In embodiments herein, the multilayer blown films have an inner layer, a first outer layer, and a second outer layer. Optionally, one or more additional inner or intermediate layers may be positioned between the first outer layer and the second outer layer. For example, the one or more additional inner or intermediate layers may be positioned between the inner layer and the first outer layer and/or the inner layer and the second outer layer. The thickness of the inner layer, first outer layer, and second outer layer can vary over a wide range. In some embodiments, the inner layer may have a thickness that is from 15% to 85% of the overall thickness of the film. The first outer layer and the second outer layer independently may have a thickness that is from 15% to 85% of the overall thickness of the film. In some embodiments, the first outer layer and the second outer layer have the same thickness. In some embodiments, the first outer layer and the second outer layer have a different thickness.

Inner Layer

The inner layer comprises an ethylene-based composition. The term, "ethylene-based composition," as used herein, refers to a polymer that comprises a majority amount of polymerized ethylene monomer (based on the total weight of the polymer), and optionally may comprise at least one polymerized comonomer. The inner layer may comprise from 50 to 100 wt. %, or from 65 to 100 wt. %, or from 75 to 100 wt. %, or from 80 to 100 wt. % of the ethylene-based composition, based on the total weight of polymers present in the inner layer. In some embodiments, the inner layer comprises greater than or equal to 70 wt. %, or greater than or equal to 80 wt. %, or greater than or equal to 90 wt. %, or greater than or equal to 95 wt. %, or greater than or equal to 98 wt. % of the ethylene-based composition, based on the total weight of polymers present in the inner layer.

The ethylene-based composition comprises at least one ethylene-based polymer, wherein the ethylene-based composition has a Molecular Weighted Comonomer Distribution Index (MWCDI) value greater than 0.9, and a melt index ratio (I10/I2) that meets the following equation: I10/I2≥7.0−1.2×log (I2). All individual values and subranges of greater than 0.9 are included and disclosed herein. For example, the MWCDI value may be less than or equal to 10.0, further less than or equal to 8.0, further less than or equal to 6.0, further less than or equal to 5.0, further less than or equal to 4.0, or further less than or equal to 3.0 and/or greater than or equal to 1.0, further greater than or equal to 1.1, further greater than or equal to 1.2, further greater than or equal to 1.3, further greater than or equal to 1.4, or further greater than or equal to 1.5. The term, "ethylene-based polymer," as used herein, refers to a polymer that comprises a majority amount of polymerized ethylene monomer (based on the total weight of the polymer), and optionally may comprise at least one polymerized comonomer.

In addition to the MWCDI value, the ethylene-based composition may have a melt index ratio (I10/I2) that meets the following equation: I10/I2≥7.0−1.2×log (I2). All individual values and subranges that meet the equation are included and disclosed herein. For example, the melt index ratio (I10/I2) may be greater than or equal to 7.0, further greater than or equal to 7.1, further greater than or equal to 7.2, further greater than or equal to 7.3 and/or less than or equal to 9.2, further less than or equal to 9.0, further less than or equal to 8.8, further less than or equal to 8.5.

In addition to the MWCDI value and the melt index ratio (I10/I2), the ethylene-based composition may have a ZSVR (zero shear viscosity ratio) value from 1.2 to 3.0. All individual values and subranges of from 1.2 to 3.0 are included and disclosed herein. For example, the ethylene-based composition may have a ZSVR value from 1.2 to 2.5 or from 1.2 to 2.0.

In addition to the MWCDI value, the melt index ratio (I10/I2), and the ZSVR value, the ethylene-based composition may have a vinyl unsaturation level of greater than 10 vinyls per 1,000,000 total carbons. All individual values and subranges of greater than 10 vinyls per 1,000,000 total carbons are included and disclosed herein. For example, the ethylene-based composition may have a vinyl unsaturation level of greater than 20 vinyls per 1,000,000 total carbons, or greater than 50 vinyls per 1,000,000 total carbons, or greater than 70 vinyls per 1,000,000 total carbons, or greater than 100 vinyls per 1,000,000 total carbons.

In addition to the MWCDI value, the melt index ratio (I10/I2), the ZSVR value, and the vinyl unsaturation level, the ethylene-based composition may have a density in the range of 0.910 to 0.940 g/cc. All individual values and subranges of 0.910 to 0.940 g/cc are included and disclosed herein. For example, the ethylene-based composition may have a density of from 0.910 to 0.930 g/cc, or from 0.910 to 0.925 g/cc. In some embodiments, the density can be from a lower limit of 0.910, 0.912, or 0.914 g/cc, to an upper limit of 0.925, 0.927, or 0.930 g/cc (1 cm$^3$=1 cc).

In addition to the MWCDI value, the melt index ratio (I10/I2), the ZSVR value, the vinyl unsaturation level, and density, the ethylene-based composition may have a melt index (I2; at 190° C./2.16 kg) of from 0.1 to 50 g/10 minutes. All individual values and subranges of 0.1 to 50 g/10 minutes are included and disclosed herein. For example, the ethylene-based composition may have a melt index (I2) of from 0.1 to 30 g/10 minutes, or from 0.1 to 20 g/10 minutes, or from 0.1 to 10 g/10 minutes. In some embodiments, the ethylene-based composition may have a melt index (I2) ranging from a lower limit of 0.1, 0.2, or 0.5 g/10 minutes, to an upper limit of 1.0, 2.0, 3.0, 4.0, 5.0, 10, 15, 20, 25, 30, 40, or 50 g/10 minutes.

In addition to the MWCDI value, the melt index ratio (I10/I2), the ZSVR value, the vinyl unsaturation level, density, and melt index (I2), the ethylene-based composition may have a molecular weight distribution, expressed as the ratio of the weight average molecular weight to number average molecular weight ($M_w/M_n$; as determined by cony. GPC) in the range of from 2.2 to 5.0. All individual values and subranges of 2.2 to 5.0 are included and disclosed herein. For example, the ethylene-based composition may have a molecular weight distribution ($M_w/M_n$) ranging from a lower limit of 2.2, 2.3, 2.4, 2.5, 3.0, 3.2, or 3.4, to an upper limit of 3.9, 4.0, 4.1, 4.2, 4.5, or 5.0.

In addition to the MWCDI value, the melt index ratio (I10/I2), the ZSVR value, the vinyl unsaturation level, density, melt index (I2), and molecular weight distribution, the ethylene-based composition may have a number average molecular weight ($M_n$; as determined by cony. GPC) in the range from 10,000 to 50,000 g/mole. All individual values and subranges of 10,000 to 50,000 g/mole are included and disclosed herein. For example, the ethylene-based composition may have a number average molecular weight ranging from a lower limit of 10,000, 20,000, or 25,000 g/mole, to an upper limit of 35,000, 40,000, 45,000, or 50,000 g/mole.

In addition to the MWCDI value, the melt index ratio (I10/I2), the ZSVR value, the vinyl unsaturation level, density, melt index (I2), molecular weight distribution, and number average molecular weight, the ethylene-based composition may have a weight average molecular weight ($M_w$; as determined by cony. GPC) in the range from 70,000 to 200,000 g/mole. All individual values and subranges of 70,000 to 200,000 g/mole are included and disclosed herein. For example, the ethylene-based composition may have a number average molecular weight ranging from a lower limit of 70,000, 85,000, or 90,000 g/mole, to an upper limit of 130,000, 140,000, 160,000, 180,000 or 200,000 g/mole.

In addition to the MWCDI value, the melt index ratio (I10/I2), the ZSVR value, the vinyl unsaturation level, density, melt index (I2), molecular weight distribution, number average molecular weight, and weight average molecular weight, the ethylene-based composition may have a melt viscosity ratio, Eta*0.1/Eta*100, in the range from 2.2 to 7.0. All individual values and subranges of 2.2 to 7.0 are included and disclosed herein. For example, the ethylene-based composition may have a melt viscosity ratio, Eta*0.1/Eta*100, ranging from a lower limit of 2.2, 2.3, 2.4 or 2.5, to an upper limit of 6.0, 6.2, 6.5, or 7.0.

As noted above, the ethylene-based composition comprises at least one ethylene-based polymer. The ethylene-based polymer may be an ethylene/α-olefin interpolymer or an ethylene/α-olefin copolymer. The term "interpolymer," as used herein, refers to a polymer prepared by the polymerization of at least two different types of monomers. The generic term interpolymer thus includes copolymers (employed to refer to polymers prepared from two different types of monomers), and polymers prepared from more than two different types of monomers. The term, "ethylene/α-olefin interpolymer," as used herein, refers to an interpolymer that comprises, in polymerized form, a majority amount of ethylene monomer (based on the weight of the interpolymer), and at least one α-olefin. The term, "ethylene/α-olefin copolymer," as used herein, refers to a copolymer that comprises, in polymerized form, a majority amount of ethylene monomer (based on the weight of the copolymer), and an α-olefin, as the only two monomer types. In some embodiments, the ethylene-based composition comprises a first ethylene-based polymer and a second ethylene-based polymer. The first ethylene-based polymer may be an ethylene/α-olefin interpolymer or an ethylene/α-olefin copolymer. The second ethylene-based polymer may be an ethylene/α-olefin interpolymer, an ethylene/α-olefin copolymer, or a low density polyethylene (LDPE).

The at least one ethylene-based polymer or, in some embodiments, the first ethylene-based polymer and the second ethylene-based polymer, comprises greater than 50 wt. % of the units derived from ethylene and less than 30 wt. % of the units derived from one or more alpha-olefin comonomers. In some embodiments, the at least one ethylene-based polymer or, in some embodiments, the first ethylene-based polymer and the second ethylene-based polymer, comprises (a) greater than or equal to 75%, greater than or equal to 80%, greater than or equal to 85%, greater than or equal to 90%, greater than or equal to 95%, greater than or equal to 99%, greater than or equal to 99.5%, by weight, of the units derived from ethylene; and (b) optionally, less than 25 percent, less than 10%, less than 5%, less than 1%, or less than 0.5%, by weight, of units derived from one or more alpha-olefin comonomers. The comonomer content may be measured using any suitable technique, such as techniques based on nuclear magnetic resonance ("NMR")

spectroscopy, and, for example, by 13C NMR analysis as described in U.S. Pat. No. 7,498,282, which is incorporated herein by reference.

Suitable α-olefin comonomers have less than, or equal to, 20 carbon atoms. For example, the α-olefin comonomers may have 3 to 10 carbon atoms, or 3 to 8 carbon atoms. Exemplary α-olefin comonomers include, but are not limited to, propylene, 1-butene, 1-pentene, 1-hexene, 1-heptene, 1-octene, 1-nonene, 1-decene, and 4-methyl-1-pentene. The one or more α-olefin comonomers may, for example, be selected from the group consisting of propylene, 1-butene, 1-hexene, and 1-octene; or in the alternative, from the group consisting of 1-butene, 1-hexene and 1-octene, and further 1-hexene and 1-octene.

The ethylene-based polymer or, in some embodiments, the first ethylene-based polymer, may have a molecular weight distribution ($M_w/M_n$; as determined by conv. GPC) in the range from 1.5 to 4.0. All individual values and subranges of 1.5 to 4.0 are included and disclosed herein. For example, the molecular weight distribution ($M_w/M_n$) can be from a lower limit of 1.5, 1.7, 2.0, 2.1, or 2.2, to an upper limit of 2.5, 2.6, 2.8, 3.0, 3.5, or 4.0. In some embodiments, the molecular weight distribution ($M_w/M_n$) may range from 1.5 to 3.5, or from 2.0 to 3.0.

The second ethylene-based polymer may be a heterogeneously branched ethylene/α-olefin interpolymer, and further a heterogeneously branched ethylene/α-olefin copolymer. Heterogeneously branched ethylene/α-olefin interpolymers and copolymers are typically produced using Ziegler/Natta type catalyst system, and have more comonomer distributed in the lower molecular weight molecules of the polymer.

In some embodiments, the second ethylene-based polymer may have a molecular weight distribution ($M_w/M_n$) in the range from 3.0 to 5.0. All individual values and subranges of 3.0 to 5.0 are included and disclosed herein. For example, the molecular weight distribution ($M_w/M_n$) can be from a lower limit of 3.2, 3.3, 3.5, 3.7, or 3.9, to an upper limit of 4.6, 4.7, 4.8, 4.9, or 5.0. In some embodiments, the molecular weight distribution ($M_w/M_n$) may range from 3.2 to 4.6.

Polymerization processes that may be used to make the ethylene-based composition include, but are not limited to, solution polymerization processes, using one or more conventional reactors, e.g., loop reactors, isothermal reactors, adiabatic reactors, stirred tank reactors, autoclave reactors in parallel, series, and/or any combinations thereof. The ethylene-based composition may, for example, be produced via solution phase polymerization processes, using one or more loop reactors, adiabatic reactors, and combinations thereof. In general, the solution phase polymerization process occurs in one or more well mixed reactors, such as one or more loop reactors and/or one or more adiabatic reactors at a temperature in the range from 115 to 250° C.; for example, from 135 to 200° C., and at pressures in the range of from 300 to 1000 psig, for example, from 450 to 750 psig.

In some embodiments, the ethylene-based composition may be produced in two loop reactors in series configuration, the first reactor temperature is in the range from 115 to 200° C., for example, from 135 to 165° C., and the second reactor temperature is in the range from 150 to 210° C., for example, from 185 to 200° C. In another embodiment, the ethylene-based composition may be produced in a single reactor, the reactor temperature is in the range from 115 to 200° C., for example from 130 to 190° C. The residence time in a solution phase polymerization process is typically in the range from 2 to 40 minutes, for example from 5 to 20 minutes. Ethylene, solvent, one or more catalyst systems, optionally one or more cocatalysts, and optionally one or more comonomers, are fed continuously to one or more reactors. Exemplary solvents include, but are not limited to, isoparaffins. For example, such solvents are commercially available under the name ISOPAR E from ExxonMobil Chemical. The resultant mixture of the ethylene-based composition and solvent is then removed from the reactor or reactors, and the ethylene-based composition is isolated. Solvent is typically recovered via a solvent recovery unit, i.e., heat exchangers and separator vessel, and the solvent is then recycled back into the polymerization system.

In other embodiments, the ethylene-based composition may be produced, via a solution polymerization process, in a dual reactor system, for example a dual loop reactor system, wherein ethylene, and optionally one or more α-olefins, are polymerized in the presence of one or more catalyst systems, in one reactor, to produce a first ethylene-based polymer, and ethylene, and optionally one or more α-olefins, are polymerized in the presence of one or more catalyst systems, in a second reactor, to produce a second ethylene-based polymer. Additionally, one or more cocatalysts may be present.

In further embodiments, the ethylene-based composition comprising at least two ethylene-based polymers may be produced as follows: polymerizing ethylene, and optionally at least one comonomer, in solution, in the present of a catalyst system comprising a metal-ligand complex of Structure I, to form a first ethylene-based polymer; and polymerizing ethylene, and optionally at least one comonomer, in the presence of a catalyst system comprising a Ziegler/Natta catalyst, to form a second ethylene-based polymer; and wherein Structure I is as follows:

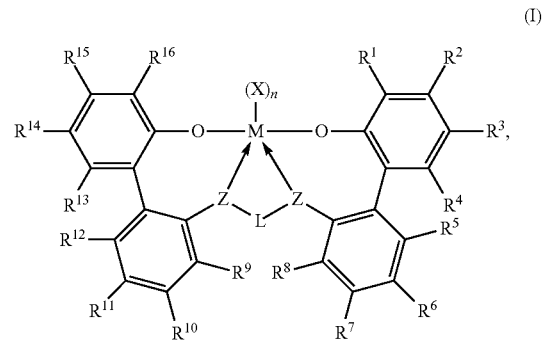

(I)

wherein:

M is titanium, zirconium, or hafnium, each, independently, being in a formal oxidation state of +2, +3, or +4, and in some embodiments, M is hafnium; and n is an integer from 0 to 3, and wherein when n is 0, X is absent; and each X, independently, is a monodentate ligand that is neutral, monoanionic, or dianionic; or two Xs are taken together to form a bidentate ligand that is neutral, monoanionic, or dianionic; and X and n are chosen, in such a way, that the metal-ligand complex of formula (I) is, overall, neutral; and each Z, independently, is O, S, N($C_1$-$C_{40}$)hydrocarbyl, or P($C_1$-$C_{40}$)hydrocarbyl; and wherein the Z-L-Z fragment is comprised of formula (1):

(1)

R$^1$ through R$^{16}$ are each, independently, selected from the group consisting of the following: a substituted or unsubstituted (C$_1$-C$_{40}$)hydrocarbyl, a substituted or unsubstituted (C$_1$-C$_{40}$)heterohydrocarbyl, Si(R$^C$)$_3$, Ge(R$^C$)$_3$, P(R$^P$)$_2$, N(R$^N$)$_2$, OR$^C$, SR$^C$, NO$_2$, CN, CF$_3$, R$^C$S(O)—, R$^C$S(O)$_2$—, (R$^C$)$_2$C=N—, R$^C$C(O)O—, R$^C$OC(O)—, R$^C$C(O)N(R)—, (R$^C$)$_2$NC(O)—, halogen atom, hydrogen atom; and wherein each R$^C$ is independently a (C1-C30)hydrocarbyl; R$^P$ is a (C1-C30)hydrocarbyl; and R$^N$ is a (C1-C30)hydrocarbyl, and in some embodiments, R$^3$ and R$^{14}$ are each independently an alkyl, or a C1-C3 alkyl, or further methyl, and/or R$^1$ and R$^{16}$ are each as follows:

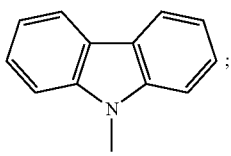;

and wherein, optionally, two or more R groups (from R$^1$ through R$^{16}$) can combine together into one or more ring structures, with such ring structures each, independently, having from 3 to 50 atoms in the ring, excluding any hydrogen atom, and in some embodiments, optionally, two or more R groups from R$^9$ through R$^{13}$, or R$^4$ through R$^8$ can combine together into one or more ring structures, with such ring structures each, independently, having from 3 to 50 atoms in the ring, excluding any hydrogen atom.

In some embodiments, the catalyst system suitable for producing the first ethylene-based polymer is a catalyst system comprising bis((2-oxoyl-3-(dibenzo-1H-pyrrole-1-yl)-5-(methyl)phenyl)-2-phenoxymethyl)-methylene-1,2-cyclohexanediylhafnium (IV) dimethyl, represented by the following Structure: IA:

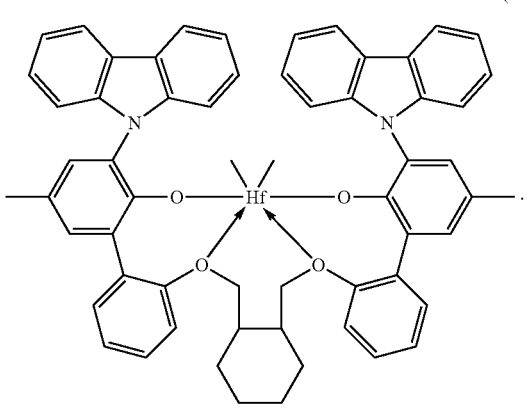

(IA)

The Ziegler/Natta catalysts suitable for use in the invention are typical supported, Ziegler-type catalysts, which are particularly useful at the high polymerization temperatures of the solution process. Examples of such compositions are those derived from organomagnesium compounds, alkyl halides or aluminum halides or hydrogen chloride, and a transition metal compound. Examples of such catalysts are described in U.S. Pat. Nos. 4,612,300; 4,314,912; and 4,547,475; the teachings of which are incorporated herein by reference.

Particularly suitable organomagnesium compounds include, for example, hydrocarbon soluble dihydrocarbyl-magnesium, such as the magnesium dialkyls and the magnesium diaryls. Exemplary suitable magnesium dialkyls include, particularly, n-butyl-sec-butyl-magnesium, diisopropylmagnesium, di-n-hexylmagnesium, isopropyl-n-butyl-magnesium, ethyl-n-hexyl-magnesium, ethyl-n-butyl-magnesium, di-n-octylmagnesium, and others, wherein the alkyl has from 1 to 20 carbon atoms. Exemplary suitable magnesium diaryls include diphenylmagnesium, dibenzyl-magnesium and ditolylmagnesium. Suitable organomagnesium compounds include alkyl and aryl magnesium alkoxides and aryloxides and aryl and alkyl magnesium halides, with the halogen-free organomagnesium compounds being more desirable.

Halide sources include active non-metallic halides, metallic halides, and hydrogen chloride. Suitable non-metallic halides are represented by the formula R'X, wherein R' is hydrogen or an active monovalent organic radical, and X is a halogen. Particularly suitable non-metallic halides include, for example, hydrogen halides and active organic halides, such as t-alkyl halides, allyl halides, benzyl halides and other active hydrocarbyl halides. By an active organic halide is meant a hydrocarbyl halide that contains a labile halogen at least as active, i.e., as easily lost to another compound, as the halogen of sec-butyl chloride, preferably as active as t-butyl chloride. In addition to the organic monohalides, it is understood that organic dihalides, trihalides and other polyhalides that are active, as defined hereinbefore, are also suitably employed. Examples of preferred active non-metallic halides, include hydrogen chloride, hydrogen bromide, t-butyl chloride, t-amyl bromide, allyl chloride, benzyl chloride, crotyl chloride, methylvinyl carbinyl chloride, a-phenylethyl bromide, diphenyl methyl chloride, and the like. Most preferred are hydrogen chloride, t-butyl chloride, allyl chloride and benzyl chloride.

Suitable metallic halides include those represented by the formula MRy-a Xa, wherein: M is a metal of Groups IIB, IIIA or IVA of Mendeleev's periodic Table of Elements; R is a monovalent organic radical; X is a halogen; y has a value corresponding to the valence of M; and "a" has a value from 1 to y. Preferred metallic halides are aluminum halides of the formula AlR$_{3-a}$X$_a$, wherein each R is independently hydrocarbyl, such as alkyl; X is a halogen; and a is a number from 1 to 3. Most preferred are alkylaluminum halides, such as ethylaluminum sesquichloride, diethylaluminum chloride, ethylaluminum dichloride, and diethylaluminum bromide, with ethylaluminum dichloride being especially preferred. Alternatively, a metal halide, such as aluminum trichloride, or a combination of aluminum trichloride with an alkyl aluminum halide, or a trialkyl aluminum compound may be suitably employed.

Any of the conventional Ziegler-Natta transition metal compounds can be usefully employed, as the transition metal component in preparing the supported catalyst component. Typically, the transition metal component is a compound of a Group IVB, VB, or VIB metal. The transition metal component is generally, represented by the formulas: TrX'$_{4-q}$(OR1)q, TrX'$_{4-q}$(R2)q, VOX'$_3$ and VO(OR)$_3$.

Tr is a Group IVB, VB, or VIB metal, preferably a Group IVB or VB metal, preferably titanium, vanadium or zirconium; q is 0 or a number equal to, or less than, 4; X' is a halogen, and R1 is an alkyl group, aryl group or cycloalkyl group having from 1 to 20 carbon atoms; and R2 is an alkyl group, aryl group, aralkyl group, substituted aralkyls, and the like.

The aryl, aralkyls and substituted aralkys contain 1 to 20 carbon atoms, preferably 1 to 10 carbon atoms. When the transition metal compound contains a hydrocarbyl group, R2, being an alkyl, cycloalkyl, aryl, or aralkyl group, the hydrocarbyl group will preferably not contain an H atom in the position beta to the metal carbon bond. Illustrative, but non-limiting, examples of aralkyl groups are methyl, neopentyl, 2,2-dimethylbutyl, 2,2-dimethylhexyl; aryl groups such as benzyl; cycloalkyl groups such as 1-norbornyl. Mixtures of these transition metal compounds can be employed if desired.

Illustrative examples of the transition metal compounds include TiCl$_4$, TiBr$_4$, Ti(OC$_2$H$_5$)$_3$Cl, Ti(OC$_2$H$_5$)Cl$_3$, Ti(OC$_4$H$_9$)$_3$Cl, Ti(OC$_3$H$_7$)$_2$Cl$_2$, Ti(OC$_6$H$_{13}$)$_2$Cl$_2$, Ti(OC$_8$H$_{17}$)$_2$Br$_2$, and Ti(OC$_{12}$H$_{25}$)Cl$_3$, Ti(O-iC$_3$H$_7$)$_4$, and Ti(O-nC$_4$H$_9$)$_4$. Illustrative examples of vanadium compounds include VCl$_4$, VOCl$_3$, VO(OC$_2$H$_5$)$_3$, and VO(OC$_4$H$_9$)$_3$. Illustrative examples of zirconium compounds include ZrCl$_4$, ZrCl$_3$(OC$_2$H$_5$), ZrCl$_2$(OC$_2$H$_5$)$_2$, ZrCl(OC$_2$H$_5$)$_3$, Zr(OC$_2$H$_5$)$_4$, ZrCl$_3$(OC$_4$H$_9$), ZrCl$_2$(OC$_4$H$_9$)$_2$, and ZrCl(OC$_4$H$_9$)$_3$.

An inorganic oxide support may be used in the preparation of the Z—N catalyst, and the support may be any particulate oxide, or mixed oxide which has been thermally or chemically dehydrated, such that it is substantially free of adsorbed moisture. See U.S. Pat. Nos. 4,612,300; 4,314,912; and 4,547,475; the teachings of which are incorporated herein by reference.

The above described catalyst systems can be rendered catalytically active by contacting it to, or combining it with, the activating co-catalyst, or by using an activating technique, such as those known in the art, for use with metal-based olefin polymerization reactions. Suitable activating co-catalysts, for use herein, include alkyl aluminums; polymeric or oligomeric alumoxanes (also known as aluminoxanes); neutral Lewis acids; and non-polymeric, non-coordinating, ion-forming compounds (including the use of such compounds under oxidizing conditions). A suitable activating technique is bulk electrolysis. Combinations of one or more of the foregoing activating co-catalysts and techniques are also contemplated. The term "alkyl aluminum" means a monoalkyl aluminum dihydride or monoalkylaluminum dihalide, a dialkyl aluminum hydride or dialkyl aluminum halide, or a trialkylaluminum. Aluminoxanes and their preparations are known at, for example, U.S. Pat. No. 6,103,657. Examples of preferred polymeric or oligomeric alumoxanes are methylalumoxane, triisobutylaluminum-modified methylalumoxane, and isobutylalumoxane.

Exemplary Lewis acid activating co-catalysts are Group 13 metal compounds containing from 1 to 3 hydrocarbyl substituents as described herein. In some embodiments, exemplary Group 13 metal compounds are tri(hydrocarbyl)-substituted-aluminum or tri(hydrocarbyl)-boron compounds. In some other embodiments, exemplary Group 13 metal compounds are tri(hydrocarbyl)-substituted-aluminum or tri(hydrocarbyl)-boron compounds are tri((C$_1$-C$_{10}$)alkyl)aluminum or tri((C$_6$-C$_{18}$)aryl)boron compounds and halogenated (including perhalogenated) derivatives thereof.

In some other embodiments, exemplary Group 13 metal compounds are tris(fluoro-substituted phenyl)boranes, in other embodiments, tris(pentafluorophenyl)borane. In some embodiments, the activating co-catalyst is a tris((C$_1$-C$_{20}$)hydrocarbyl) borate (e.g., trityl tetrafluoroborate) or a tri ((C$_1$-C$_{20}$)hydrocarbyl)ammonium tetra((C$_1$-C$_{20}$)hydrocarbyl)borane (e.g., bis(octadecyl)methylammonium tetrakis (pentafluorophenyl)borane). As used herein, the term "ammonium" means a nitrogen cation that is a ((C$_1$-C$_{20}$)hydrocarbyl)$_4$N$^+$, a ((C$_1$-C$_{20}$)hydrocarbyl)$_3$N(H)$^+$, a ((C$_1$-C$_{20}$)hydrocarbyl)$_2$N(H)$_2^+$, (C$_1$-C$_{20}$)hydrocarbylN(H)$_3^+$, or N(H)$_4^+$, wherein each (C$_1$-C$_{20}$)hydrocarbyl may be the same or different.

Exemplary combinations of neutral Lewis acid activating co-catalysts include mixtures comprising a combination of a tri((C$_1$-C$_4$)alkyl)aluminum and a halogenated tri((C$_6$-C$_{18}$)aryl)boron compound, especially a tris(pentafluorophenyl)borane. Other exemplary embodiments are combinations of such neutral Lewis acid mixtures with a polymeric or oligomeric alumoxane, and combinations of a single neutral Lewis acid, especially tris(pentafluorophenyl)borane with a polymeric or oligomeric alumoxane. Exemplary embodiments ratios of numbers of moles of (metal-ligand complex): (tris(pentafluoro-phenylborane): (alumoxane) [e.g., (Group 4 metal-ligand complex):(tris(pentafluoro-phenylborane): (alumoxane)] are from 1:1:1 to 1:10:30, other exemplary embodiments are from 1:1:1.5 to 1:5:10.

Many activating co-catalysts and activating techniques have been previously taught, with respect to different metal-ligand complexes, in the following U.S. patents: U.S. Pat. Nos. 5,064,802; 5,153,157; 5,296,433; 5,321,106; 5,350,723; 5,425,872; 5,625,087; 5,721,185; 5,783,512; 5,883,204; 5,919,983; 6,696,379; and 7,163,907. Examples of suitable hydrocarbyloxides are disclosed in U.S. Pat. No. 5,296,433. Examples of suitable Bronsted acid salts for addition polymerization catalysts are disclosed in U.S. Pat. Nos. 5,064,802; 5,919,983; 5,783,512. Examples of suitable salts of a cationic oxidizing agent and a non-coordinating, compatible anion, as activating co-catalysts for addition polymerization catalysts, are disclosed in U.S. Pat. No. 5,321,106. Examples of suitable carbenium salts as activating co-catalysts for addition polymerization catalysts are disclosed in U.S. Pat. No. 5,350,723. Examples of suitable silylium salts, as activating co-catalysts for addition polymerization catalysts, are disclosed in U.S. Pat. No. 5,625,087. Examples of suitable complexes of alcohols, mercaptans, silanols, and oximes with tris(pentafluorophenyl)borane are disclosed in U.S. Pat. No. 5,296,433. Some of these catalysts are also described in a portion of U.S. Pat. No. 6,515,155 B1, beginning at column 50, at line 39, and going through column 56, at line 55, only the portion of which is incorporated by reference herein.

In some embodiments, the above described catalyst systems can be activated to form an active catalyst composition by combination with one or more cocatalyst, such as a cation forming cocatalyst, a strong Lewis acid, or a combination thereof. Suitable cocatalysts for use include polymeric or oligomeric aluminoxanes, especially methyl aluminoxane, as well as inert, compatible, noncoordinating, ion forming compounds. Exemplary suitable cocatalysts include, but are not limited to, modified methyl aluminoxane (MMAO), bis(hydrogenated tallow alkyl)methyl, tetrakis(pentafluorophenyl)borate(1-) amine, triethyl aluminum (TEA), and any combinations thereof.

In some embodiments, one or more of the foregoing activating co-catalysts are used in combination with each other. In one embodiment, a combination of a mixture of a tri(($C_1$-$C_4$)hydrocarbyl)aluminum, tri(($C_1$-$C_4$)hydrocarbyl)borane, or an ammonium borate with an oligomeric or polymeric alumoxane compound, can be used.

The ethylene-based composition may comprise one or more additives. Additives include, but are not limited to, antistatic agents, color enhancers, dyes, lubricants, fillers (for example, $TiO_2$ or $CaCO_3$), opacifiers, nucleators, processing aids, pigments, primary anti-oxidants, secondary anti-oxidants, UV stabilizers, anti-blocks, slip agents, tackifiers, fire retardants, anti-microbial agents, odor reducer agents, anti-fungal agents, and combinations thereof. An ethylene-based composition may comprise from about 0.001 to about 10 percent by the combined weight of such additives, based on the weight of the composition including such additives.

The ethylene-based composition may further comprise one or more other polymers. For example one or more other ethylene-based polymers (such polymers differ in one or more properties from the ethylene-based polymer, or in some embodiments, the first ethylene-based polymer and the second ethylene-based polymer; for e.g., density, melt index, comonomer, Mn, Mw, and/or MWD), or one or more propylene-based polymers, or combinations thereof. The term "propylene-based polymer," as used herein, refers to a polymer that comprises, in polymerized form, a majority amount of propylene monomer (based on the total weight of the polymer) and optionally may comprise at least one polymerized comonomer. Such compositions may be blended via any method, known to a person of ordinary skill in the art, including, but not limited to, dry blending, and melt blending via any suitable equipment, for example, an extruder.

First Outer Layer and Second Outer Layer

The first outer layer and the second outer layer independently comprise a polyethylene composition. The first outer layer and the second outer layer independently may comprise from 50 to 100 wt. %, or from 65 to 100 wt. %, or from 75 to 100 wt. %, or from 80 to 100 wt. % of the polyethylene composition, based on the total weight of polymers present in the first outer layer or second outer layer, respectively. In some embodiments, the first outer layer and the second outer layer comprises greater than or equal to 70 wt %, or greater than or equal to 80 wt %, or greater than or equal to 90 wt %, or greater than or equal to 95 wt %, or greater than or equal to 98 wt % of the polyethylene composition, based on the total weight of polymers present in the first outer layer or the second outer layer, respectively.

The polyethylene composition that comprises the reaction product of ethylene and, optionally, one or more alpha olefin comonomers. The polyethylene composition comprises greater than 70 wt. % of the units derived from ethylene and less than 30 wt. % of the units derived from one or more alpha-olefin comonomers. In some embodiments, the polyethylene composition comprises (a) greater than or equal to 75%, greater than or equal to 85%, greater than or equal to 90%, greater than or equal to 92%, greater than or equal to 95%, greater than or equal to 97%, greater than or equal to 99%, greater than or equal to 99.5%, by weight, of the units derived from ethylene; and (b) optionally, less than 30 percent, for example, less than 25 percent, less than 15%, less than 10%, less than 8%, less than 5%, less than 3%, less than 1%, by weight, of units derived from one or more α-olefin comonomers. The comonomer content may be measured using any suitable technique, such as techniques based on NMR spectroscopy, and, for example, by 13C NMR analysis as described in U.S. Pat. No. 7,498,282, which is incorporated herein by reference.

Suitable comonomers may include alpha-olefin comonomers, typically having no more than 20 carbon atoms. The one or more alpha-olefins may be selected from the group consisting of C3-C20 acetylenically unsaturated monomers and C4-C18 diolefins. Those skilled in the art will understand that the selected monomers are desirably those that do not destroy conventional Ziegler-Natta catalysts. For example, the alpha-olefin comonomers may have 3 to 10 carbon atoms, or 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The one or more alpha-olefin comonomers may, for example, be selected from the group consisting of propylene, 1-butene, 1-hexene, and 1-octene; or in the alternative, from the group consisting of 1-butene, 1-hexene and 1-octene. In some embodiments, the polyethylene composition comprises greater than 0 wt. % and less than 30 wt. % of units derived from one or more of octene, hexene, or butene comonomers.

In some embodiments, the polyethylene composition of the first outer layer or second outer layer is formed in the presence of a catalyst composition comprising a multimetallic procatalyst via solution polymerization. The multimetallic procatalyst used in producing the reaction product is at least trimetallic, but may also include more than three transition metals, and thus may in one embodiment be defined more comprehensively as multi-metallic. These three, or more, transition metals are selected prior to production of the catalyst. In a particular embodiment, the multi-metal catalyst comprises titanium as one element.

The catalyst compositions may be prepared beginning first with preparation of a conditioned magnesium halide based support. Preparation of a conditioned magnesium halide based support begins with selecting an organomagnesium compound or a complex including an organomagnesium compound. Such compound or complex is desirably soluble in an inert hydrocarbon diluent. The concentrations of components are preferably such that when the active halide, such as a metallic or non-metallic halide, and the magnesium complex are combined, the resultant slurry is from about 0.005 to about 0.25 molar (moles/liter) with respect to magnesium. Examples of suitable inert organic diluents include liquefied ethane, propane, isobutane, n-butane, n-hexane, the various isomeric hexanes, isooctane, paraffinic mixtures of alkanes having from 5 to 10 carbon atoms, cyclohexane, methylcyclopentane, dimethylcyclohexane, dodecane, industrial solvents composed of saturated or aromatic hydrocarbons such as kerosene, naphthas, and combinations thereof, especially when freed of any olefin compounds and other impurities, and especially those having boiling points in the range from about −50° C. to about 200° C. Also included as suitable inert diluents are ethylbenzene, cumene, decalin and combinations thereof.

Suitable organomagnesium compounds and complexes may include, for example, magnesium C2-C8 alkyls and aryls, magnesium alkoxides and aryloxides, carboxylated magnesium alkoxides, and carboxylated magnesium aryloxides. Preferred sources of magnesium moieties may include the magnesium C2-C8 alkyls and C1-C4 alkoxides. Such organomagnesium compound or complex may be reacted with a metallic or non-metallic halide source, such as a chloride, bromide, iodide, or fluoride, in order to make a magnesium halide compound under suitable conditions. Such conditions may include a temperature ranging from −25° C. to 100° C., alternatively, 0° C. to 50° C.; a time ranging from 1 to 12 hours, alternatively, from 4 to 6 hours; or both. The result is a magnesium halide based support.

The magnesium halide support is then reacted with a selected conditioning compound containing an element selected from the group consisting of boron, aluminum, gallium, indium and tellurium, under conditions suitable to form a conditioned magnesium halide support. This compound and the magnesium halide support are then brought into contact under conditions sufficient to result in a conditioned magnesium halide support. Such conditions may include a temperature ranging from 0° C. to 50° C., or alternatively, from 25° C. to 35° C.; a time ranging from 4 to 24 hours, or alternatively, from 6 to 12 hours; or both. The conditioning compound has a molar ratio constitution that is specific and which is believed to be an important feature in ensuring the desirable catalyst performance. Specifically, the procatalyst desirably exhibits a molar ratio of the magnesium to the conditioning compound that ranges from 3:1 to 6:1. Without wishing to be bound by any theory of mechanism, it is suggested that this aging serves to facilitate or enhance adsorption of additional metals onto the support.

Once the conditioned support is prepared and suitably aged, it is brought into contact with a titanium compound which may be added individually or as a mixture with the "second metal". In certain preferred embodiments titanium halides or alkoxides, or combinations thereof, may be selected. Conditions may include a temperature within the range from 0° C. to 50° C., alternatively from 25° C. to 35° C.; a time from 3 hours to 24 hours, alternatively from 6 hours to 12 hours; or both. The result of this step is adsorption of at least a portion of the titanium compound onto the conditioned magnesium halide support.

Finally, one or two additional metals, referred to herein as "the second metal" and "the third metal" for convenience, will also be adsorbed onto the magnesium-based support, The "second metal" and the "third metal" are independently selected from zirconium (Zr), hafnium (Hf), vanadium (V), niobium (Nb), tantalum (Ta), chromium (Cr), molybdenum (Mo), and tungsten (W). These metals may be incorporated in any of a variety of ways known to those skilled in the art, but generally contact between the conditioned magnesium based halide support including titanium and the selected second and third metals, in, e.g., liquid phase such as an appropriate hydrocarbon solvent, will be suitable to ensure deposition of the additional metals to form what may now be referred to as the "procatalyst," which is a multi-metallic procatalyst.

The multi-metallic procatalyst has a molar ratio constitution that is specific and which is believed to be an important feature in ensuring the desirable polymer properties that may be attributed to the catalyst made from the procatalyst. Specifically, the procatalyst desirably exhibits a molar ratio of the magnesium to a combination of the titanium and the second and third metals that ranges from 30:1 to 5:1; under conditions sufficient to form a multi-metallic procatalyst. Thus, the overall molar ratio of magnesium to titanium ranges from 8:1 to 80:1.

Once the procatalyst has been formed, it may be used to form a final catalyst by combining it with a cocatalyst consisting of at least one organometallic compound such as an alkyl or haloalkyl of aluminum, an alkylaluminum halide, a Grignard reagent, an alkali metal aluminum hydride, an alkali metal borohydride, an alkali metal hydride, an alkaline earth metal hydride, or the like. The formation of the final catalyst from the reaction of the procatalyst and the organometallic cocatalyst may be carried out in situ, or just prior to entering the polymerization reactor. Thus, the combination of the cocatalyst and the procatalyst may occur under a wide variety of conditions. Such conditions may include, for example, contacting them under an inert atmosphere such as nitrogen, argon or other inert gas at temperatures in the range from 0° C. to 250° C., preferably from 15° C. to 200° C. In the preparation of the catalytic reaction product, it is not necessary to separate hydrocarbon soluble components from hydrocarbon insoluble components. Time for contact between the procatalyst and cocatalyst may desirably range, for example, from 0 to 240 seconds, preferably from 5 to 120 seconds. Various combinations of these conditions may be employed.

In embodiments described herein, the polyethylene composition may have a metal catalyst residual of greater than or equal to 1 parts by combined weight of at least three metal residues per one million parts of polyethylene polymer, wherein the at least three metal residues are selected from the group consisting of titanium, zirconium, hafnium, vanadium, niobium, tantalum, chromium, molybdenum, tungsten, and combinations thereof, and wherein each of the at least three metal residues is present at greater than or equal to 0.2 ppm, for example, in the range of from 0.2 to 5 ppm. All individual values and subranges from greater than or equal to 0.2 ppm are included herein and disclosed herein; for example, the polyethylene composition may further comprise greater than or equal to 2 parts by combined weight of at least three metal residues remaining from the multi-metallic polymerization catalyst per one million parts of the polyethylene composition.

In some embodiments, the polyethylene composition comprises at least 0.75 ppm of V (Vanadium). All individual values and subranges from at least 0.75 ppm of V are included and disclosed herein; for example the lower limit of the V in the polyethylene composition may be 0.75, 1, 1.1, 1.2, 1.3 or 1.4 ppm to an upper limit of the V in the polyethylene composition may be 5, 4, 3, 2, 1.9, 1.8, 1.7, 1.6, 1.5, or 1 ppm. The vanadium catalyst metal residual concentration for the polyethylene composition can be measured using the Neutron Activation Method for Metals described below.

In some embodiments, the polyethylene composition comprises at least 0.3 ppm of Zr (Zirconium). All individual values and subranges of at least 0.3 ppm of Zr are included and disclosed herein; for example the lower limit of the Zr in the polyethylene composition may be 0.3, 0.4, 0.5, 0.6 or 0.7 ppm. In yet another embodiment, the upper limit of the Zr in the polyethylene composition may be 5, 4, 3, 2, 1, 0.9, 0.8 or 0.7 ppm. The zirconium catalyst metal residual concentration for the polyethylene composition can be measured using the Neutron Activation Method for Metals described below.

In embodiments described herein, the polyethylene composition may have a density of 0.910 g/cc to 0.930 g/cc. All individual values and subranges of at least 0.910 g/cc to 0.930 g/cc are included and disclosed herein. For example, in some embodiments, the polyethylene has a density of 0.910 to 0.927 g/cc, 0.910 to 0.925 g/cc, 0.915 to 0.930 g/cc, 0.915 to 0.925 g/cc, or 0.915 to 0.922 g/cc. Density may be measured in accordance with ASTM D792.

In addition to the density, the polyethylene composition may have a melt index, $I_2$, of 0.1 g/10 min to 2.0 g/10 min. All individual values and subranges of at least 0.1 g/10 min to 2.0 g/10 min are included and disclosed herein. For example, in some embodiments, the polyethylene composition may have a melt index, $I_2$, of 0.1 g/10 min to 1.5 g/10 min, 0.5 g/10 min to 1.5 g/10 min, 0.5 g/10 min to 1.0 g/10 min, or 0.7 g/10 min to 1.0 g/10 min.

In addition to the density and melt index, $I_2$, the polyethylene composition may have a melt flow ratio, I10/I2, of from 6.0 to 7.6. All individual values and subranges of from 6.0 to 7.6 are included and disclosed herein. For example, the polyethylene composition may have a melt flow ratio, I10/I2, of from 6.0 to 7.5, 6.2 to 7.5, 6.5 to 7.5, 6.5 to 7.4, or, 6.5 to 7.3. In further embodiments, the polyethylene composition may have a melt flow ratio, I10/I2, of from 6.2 to 7.5, 6.3 to 7.4, 6.4 to 7.3, or 6.5 to 7.2.

In addition to the density, melt index, $I_2$, and melt flow ratio, I10/I2, the polyethylene composition may have a molecular weight distribution (Mw/Mn) of from 2.5 to 4.0. All individual values and subranges of from 2.5 to 4.0 are included and disclosed herein. For example, the polyethylene composition may have an Mw/Mn ratio from a lower limit of 2.5, 2.6, 2.7, or 2.8 to an upper limit of 4.0, 3.9, 3.8, or 3.7. In some embodiments, the polyethylene composition may have an Mw/Mn ratio of from 2.7 to 3.9, 2.8 to 3.9, or 2.8 to 3.7. In other embodiments, the polyethylene composition may have an Mw/Mn ratio of from 3.0 to 4.0, 3.1 to 3.9, 3.2 to 3.9, 3.3 to 3.8, or 3.4 to 3.7. Molecular weight distribution can be described as the ratio of weight average molecular weight ($M_w$) to number average molecular weight ($M_n$) (i.e., $M_w/M_n$), and is measured by conventional gel permeation chromatography (cony. GPC).

In embodiments described herein, the polyethylene composition may have a number average molecular weight, Mn (g/mol), of from 30,000 to 50,000 g/mol. All individual values and subranges of from 30,000 to 50,000 g/mol are included and disclosed herein. For example, the polyethylene composition may have a Mn from 30,000 to 45,000 g/mol, 30,000 to 40,000 g/mol, 32,000 to 38,000 g/mol, 34,000 to 37,000 g/mol, or 35,000 to 36,000 g/mol.

In embodiments described herein, the polyethylene composition may have a weight average molecular weight, Mw (g/mol), of from 110,000 to 140,000 g/mol. All individual values and subranges of from 110,000 to 140,000 g/mol are included and disclosed herein. For example, the polyethylene composition may have an Mw from 115,000 to 135,000 g/mol, 117,000 to 133,000 g/mol, or 119,000 to 131,000 g/mol.

In embodiments described herein, the polyethylene composition may have a z average molecular weight, Mz (g/mol), of from 300,000 to 425,000 g/mol. All individual values and subranges of from 300,000 to 425,000 g/mol are included and disclosed herein. For example, the polyethylene composition may have an Mz from 325,000 to 425,000 g/mol, 330,000 to 425,000 g/mol, or 360,000 to 411,000 g/mol.

In embodiments described herein, the polyethylene composition may have a viscosity ratio (viscosity at 0.1 rad/s/ viscosity at 100 rad/s, both measured at 190° C.) of 3 to 6. All individual values and subranges of from 3 to 6 are included and disclosed herein. For example, the polyethylene composition may have a viscosity ratio of from 4 to 6, or 4.5 to 5.5.

In embodiments described herein, the polyethylene composition may have a tan delta at 0.1 rad/s measured at 190° C. of 5 to 25. All individual values and subranges of from 5 to 25 are included and disclosed herein. For example, the polyethylene composition may have a tan delta at 0.1 rad/s measured at 190° C. of from 5 to 20, 5 to 15, or 10 to 13.

In embodiments described herein, the polyethylene composition may have a composition distribution breadth index, CDBI, of less than 60%. All individual values and subranges of less than 60% are included and disclosed herein. For example, in some embodiments, the polyethylene composition may have a CDBI of less than 58%, 55%, 53%, 51%, 50.5%, or 50.0%. In other embodiments, the CDBI may be from 30% to 60%, 35% to 50%, or from 40% to 48%.

The CDBI may be defined as the weight percent of the polymer molecules having a comonomer content within 50 percent of the median total molar comonomer content. The CDBI of linear polyethylene, which does not contain a comonomer, is defined to be 100%. The CDBI of a copolymer is readily calculated from data obtained from crystallization elution fractionation ("CEF") as described below. Unless otherwise indicated, terms such as "comonomer content", "average comonomer content" and the like refer to the bulk comonomer content of the indicated interpolymer blend, blend component, or fraction on a molar basis.

The polyethylene composition may comprise one or more additives. Additives include, but are not limited to, antistatic agents, color enhancers, dyes, lubricants, fillers (for example, $TiO_2$ or $CaCO_3$), opacifiers, nucleators, processing aids, pigments, primary anti-oxidants, secondary anti-oxidants, oxo biodegradables, UV stabilizers, anti-blocks, slip agents, tackifiers, fire retardants, anti-microbial agents, odor reducer agents, anti-fungal agents, and combinations thereof. The polyethylene composition may comprise from about 0.001 to about 10 percent by the combined weight of such additives, based on the weight of the composition including such additives.

The polyethylene composition may further comprise one or more other polymers. For example one or more other ethylene-based polymers (such polymers differ in one or more properties from the polyethylene composition; for e.g., density, melt index, comonomer, Mn, Mw, and/or MWD), or one or more propylene-based polymers, or combinations thereof. Such compositions may be blended via any method, known to a person of ordinary skill in the art, including, but not limited to, dry blending, and melt blending via any suitable equipment, for example, an extruder.

Multilayer Blown Films

The multilayer blown films described herein can be made by a variety of techniques. For example, methods of making multilayer blown films are described in U.S. Pat. No. 6,521,338 (Maka), the entirety of which patent is incorporated herein by reference. For example, in some embodiments, a multilayer blown film can be made by co-extruding an inner layer composition with the first outer layer composition and the second outer layer composition in an extruder to form a tube having an inner layer, a first outer layer, and a second outer layer, and cooling the tube to form a multilayer blown film.

In embodiments described herein, the multilayer blown film has a thickness of 0.3 to 5 mils. For example, the multilayer blown film can have a thickness from a lower limit of 0.3 mils, 0.5 mils, 0.7 mils, 1.0 mil, 1.75 mils, and 2.0 mils to an upper limit of 3.0 mils, 4.0 mils, or 5.0 mils.

In embodiments described herein, the multilayer blown film may exhibit a total haze of less than 12% for a blown film having a thickness of 1 mil. For example, the multilayer blown film may exhibit a total haze of less than 10%, 8%, 5%, 4.5%, or 4% for a blown film having a thickness of 1 mil. In addition to the total haze, the multilayer blown film may exhibit a 45° gloss of greater than 65 gloss units. For example, the multilayer blown film may exhibit a 45° gloss of greater than or equal to 70 gloss units. In addition to the total haze and the 45° gloss, the multilayer blown film may exhibit improved dart and/or MD tear properties.

The multilayer blown films described herein can be incorporated into a variety of articles including, for example, food packages, industrial and consumer packaging materials, construction films, foamed films, and others. Food packages can comprise a blown film according to the present invention. A variety of food items known to those of skill in the art can be provided in such food packages including, for example, solid foods, liquids, beverages, cooking ingredients (e.g., sugar, flour, etc.), etc.

Industrial and consumer packaging materials can comprise the multilayer blown films described herein. Exemplary industrial and consumer packaging materials include construction films (including, e.g., concrete underlayment), protective films, films for waste management application, agricultural films, heavy duty shipping sacks, silage wraps, silage bags, blown stretch wrap films, collation shrink films, stretch hood films, shrink hood films, industrial and consumer liners, and others. In embodiments related to silage or stretch wrap, the multilayer blown films can further comprise polyisobutylene. Exemplary construction films that can comprise a multilayer blown film include surface protection films, vapor/gas barriers for use under concrete slabs (concrete underlayment), and others.

Test Methods

Density

Density can be measured in accordance with ASTM D-792.

Melt Index

Melt index (I2) can be measured in accordance with ASTM D-1238, Procedure B (condition 190° C./2.16 kg). Melt index ($I_{10}$) can be measured in accordance with ASTM D-1238, Procedure B (condition 190° C./10.0 kg).

Conventional Gel Permeation Chromatography (Cony. GPC)

A GPC-IR high temperature chromatographic system from PolymerChar (Valencia, Spain), was equipped with a Precision Detectors (Amherst, Mass.), 2-angle laser light scattering detector Model 2040, an IR5 infra-red detector and a 4-capillary viscometer, both from PolymerChar. Data collection was performed using PolymerChar Instrument Control software and data collection interface. The system was equipped with an on-line, solvent degas device and pumping system from Agilent Technologies (Santa Clara, Calif.).

Injection temperature was controlled at 150 degrees Celsius. The columns used, were three, 10-micron "Mixed-B" columns from Polymer Laboratories (Shropshire, UK). The solvent used was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently at 160 degrees Celsius for three hours. The injection volume was "200 microliters,' and the flow rate was "1 milliliters/minute." The GPC column set was calibrated by running 21 "narrow molecular weight distribution" polystyrene standards. The molecular weight (MW) of the standards ranges from 580 to 8,400,000 g/mole, and the standards were contained in six "cocktail" mixtures. Each standard mixture had at least a decade of separation between individual molecular weights. The standard mixtures were purchased from Polymer Laboratories. The polystyrene standards were prepared at "0.025 g in 50 mL of solvent" for molecular weights equal to, or greater than, 1,000,000 g/mole, and at "0.050 g in 50 mL of solvent" for molecular weights less than 1,000,000 g/mole.

The polystyrene standards were dissolved at 80° C., with gentle agitation, for 30 minutes. The narrow standards mixtures were run first, and in order of decreasing "highest molecular weight component," to minimize degradation. The polystyrene standard peak molecular weights were converted to polyethylene molecular weight using Equation 1 (as described in Williams and Ward, J. Polym. Sci., Polym. Letters, 6, 621 (1968)):

$$M\text{polyethylene} = A \times (M\text{polystyrene})^B \quad \text{(Eqn. 1)},$$

where M is the molecular weight, A is equal to 0.4316 and B is equal to 1.0.

Number-average molecular weight ($M_n$(conv gpc)), weight average molecular weight (Mw-cony gpc), and z-average molecular weight (Mz(conv gpc)) were calculated according to Equations 2-4 below.

$$Mn(conv\ gpc) = \frac{\sum_{i=RV_{integration\ start}}^{i=RV_{integration\ end}} (IR_{measurement\ channel_i})}{\sum_{i=RV_{integration\ start}}^{i=RV_{integration\ end}} (IR_{measurement\ channel_i} / M_{PE_i})} \quad \text{(Eqn. 2)}$$

$$Mw(conv\ gpc) = \frac{\sum_{i=RV_{integration\ start}}^{i=RV_{integration\ end}} (M_{PE_i}\ IR_{measurement\ channel_i})}{\sum_{i=RV_{integration\ start}}^{i=RV_{integration\ end}} (IR_{measurement\ channel_i})} \quad \text{(Eqn. 3)}$$

$$Mz(conv\ gpc) = \frac{\sum_{i=RV_{integration\ start}}^{i=RV_{integration\ end}} (M_{PE_i}^2\ IR_{measurement\ channel_i})}{\sum_{i=RV_{integration\ start}}^{i=RV_{integration\ end}} (M_{PE_i}\ IR_{measurement\ channel_i})} \quad \text{(Eqn. 4)}$$

In Equations 2-4, the RV is column retention volume (linearly-spaced), collected at "1 point per second," the IR is the baseline-subtracted IR detector signal, in Volts, from the IR5 measurement channel of the GPC instrument, and $M_{PE}$ is the polyethylene-equivalent MW determined from Equation 1. Data calculation was performed using "GPC One software (version 2.013H)" from PolymerChar.

Creep Zero Shear Viscosity Measurement Method

Zero-shear viscosities were obtained via creep tests, which were conducted on an AR-G2 stress controlled rheometer (TA Instruments; New Castle, Del.), using "25-mm-diameter" parallel plates, at 190° C. The rheometer oven was set to test temperature for at least 30 minutes, prior to zeroing the fixtures. At the testing temperature, a compression molded sample disk was inserted between the plates, and allowed to come to equilibrium for five minutes. The upper plate was then lowered down to 50 μm (instrument setting) above the desired testing gap (1.5 mm). Any superfluous material was trimmed off, and the upper plate was lowered to the desired gap. Measurements were done under nitrogen purging, at a flow rate of 5 L/min. The default creep time was set for two hours. Each sample was compression-molded into a "2 mm thick x 25 mm diameter" circular plaque, at 177° C., for five minutes, under 10 MPa pressure, in air. The sample was then taken out of the press and placed on a counter top to cool.

A constant low shear stress of 20 Pa was applied for all of the samples, to ensure that the steady state shear rate was low enough to be in the Newtonian region. The resulting steady state shear rates were in the range from $10^{-3}$ to $10^{-4}$ $s^{-1}$ for the samples in this study. Steady state was determined by taking a linear regression for all the data, in the last 10% time window of the plot of "log (J(t)) vs. log(t)," where J(t) was creep compliance and t was creep time. If the slope of the linear regression was greater than 0.97, steady state was considered to be reached, then the creep test was stopped. In all cases in this study, the slope meets the criterion within one hour. The steady state shear rate was determined from the slope of the linear regression of all of the data points, in the last 10% time window of the plot of "ε vs. t," where ε was strain. The zero-shear viscosity was determined from the ratio of the applied stress to the steady state shear rate.

In order to determine if the sample was degraded during the creep test, a small amplitude oscillatory shear test was conducted before, and after, the creep test, on the same specimen from 0.1 to 100 rad/s. The complex viscosity values of the two tests were compared. If the difference of the viscosity values, at 0.1 rad/s, was greater than 5%, the sample was considered to have degraded during the creep test, and the result was discarded.

Zero-Shear Viscosity Ratio (ZSVR) is defined as the ratio of the zero-shear viscosity (ZSV) of the branched polyethylene material to the ZSV of a linear polyethylene material (see ANTEC proceeding below) at the equivalent weight average molecular weight (Mw(conv gpc)), according to the following Equation 5:

$$ZSVR = \frac{\eta_{0B}}{\eta_{0L}} = \frac{\eta_{0B}}{2.29^{-15} M_{w(conv \cdot gpc)}^{3.65}}. \quad \text{(Eqn. 5)}$$

The ZSV value was obtained from creep test, at 190° C., via the method described above. The Mw(conv gpc) value was determined by the conventional GPC method (Equation 3), as discussed above. The correlation between ZSV of linear polyethylene and its Mw(conv gpc) was established based on a series of linear polyethylene reference materials. A description for the ZSV-Mw relationship can be found in the ANTEC proceeding: Karjala et al., *Detection of Low Levels of Long-chain Branching in Polyolefins*, Annual Technical Conference—Society of Plastics Engineers (2008), 66th 887-891.

$^1$H NMR Method

A stock solution (3.26 g) was added to "0.133 g of the polymer sample" in 10 mm NMR tube. The stock solution was a mixture of tetrachloroethane-d$_2$ (TCE) and perchloroethylene (50:50, w:w) with 0.001M Cr$^{3+}$. The solution in the tube was purged with N$_2$, for 5 minutes, to reduce the amount of oxygen. The capped sample tube was left at room temperature, overnight, to swell the polymer sample. The sample was dissolved at 110° C. with periodic vortex mixing. The samples were free of the additives that may contribute to unsaturation, for example, slip agents such as erucamide. Each $^1$H NMR analysis was run with a 10 mm cryoprobe, at 120° C., on Bruker AVANCE 400 MHz spectrometer.

Two experiments were run to get the unsaturation: the control and the double presaturation experiments. For the control experiment, the data was processed with an exponential window function with LB=1 Hz, and the baseline was corrected from 7 to −2 ppm. The signal from residual $^1$H of TCE was set to 100, and the integral I$_{total}$ from −0.5 to 3 ppm was used as the signal from whole polymer in the control experiment. The "number of CH$_2$ group, NCH$_2$," in the polymer was calculated as follows in Equation 1A:

$$NCH_2 = I_{total}/2 \quad \text{(Eqn. 1A)}$$

For the double presaturation experiment, the data was processed with an exponential window function with LB=1 Hz, and the baseline was corrected from about 6.6 to 4.5 ppm. The signal from residual $^1$H of TCE was set to 100, and the corresponding integrals for unsaturations (I$_{vinylene}$, I$_{trisubstituted}$, I$_{vinyl}$ and I$_{vinylidene}$) were integrated. It is well known to use NMR spectroscopic methods for determining polyethylene unsaturation, for example, see Busico, V., et al., *Macromolecules*, 2005, 38, 6988. The number of unsaturation unit for vinylene, trisubstituted, vinyl and vinylidene were calculated as follows:

$$N_{vinylene} = I_{vinylene}/2 \quad \text{(Eqn. 2A)},$$

$$N_{trisubstituted} = I_{trisubstitute} \quad \text{(Eqn. 3A)},$$

$$N_{vinyl} = I_{vinyl}/2 \quad \text{(Eqn. 4A)},$$

$$N_{vinylidene} = I_{vinylidene}/2 \quad \text{(Eqn. 5A)}.$$

The unsaturation units per 1,000 carbons, all polymer carbons including backbone carbons and branch carbons, were calculated as follows:

$$N_{vinylene}/1,000C = (N_{vinylene}/NCH_2)*1,000 \quad \text{(Eqn. 6A)},$$

$$N_{trisubstituted}/1,000C = (N_{trisubstitute}/NCH_2)*1,000 \quad \text{(Eqn. 7A)},$$

$$N_{vinyl}/1,000C = (N_{vinyl}/NCH_2)*1,000 \quad \text{(Eqn. 8A)},$$

$$N_{vinylidene}/1,000C = (N_{vinylidene}/NCH_2)*1,000 \quad \text{(Eqn. 9A)},$$

The chemical shift reference was set at 6.0 ppm for the $^1$H signal from residual proton from TCE-d2. The control was run with ZG pulse, NS=4, DS=I$_2$, SWH=10,000 Hz, AQ=1.64 s, D1=14 s. The double presaturation experiment was run with a modified pulse sequence, with O1P=1.354 ppm, O2P=0.960 ppm, PL9=57 db, PL21=70 db, NS=100, DS=4, SWH=10,000 Hz, AQ=1.64 s, D1=1 s (where D1 is the presaturation time), D13=13 s. Only the vinyl levels were reported in Table 2 below.

Neutron Activation Method for Metals

Two sets of duplicate samples were prepared by transferring approximately 3.5 grams of the pellets into pre-cleaned 2 dram polyethylene vials. Standards were prepared for each metal tested from their NIST traceable standard solutions (Certi. pure from SPEX) into 2-dram polyethylene vials. They were diluted using milli-Q pure water to 6 ml and the vials were heat-sealed. The samples and standards were then analyzed for these elements, using a Mark I TRIGA nuclear reactor. The reactions and experimental conditions used for these elements are summarized in the table below. The samples were transferred to un-irradiated vials before doing the gamma-spectroscopy. The elemental concentrations were calculated using CANBERRA software and standard comparative technique. Table 1 provides measurement parameters for metals determination.

TABLE 1

Reactions and experimental conditions used for elements during neutron activation.

| Elements | Nuclear reaction | Isotope | Half life | Reactor Power |
|---|---|---|---|---|
| Al | $^{27}$Al(n,γ)$^{28}$Al | $^{28}$Al | 2.24 m | 250 kW |
| Cl | $^{37}$Cl(n,γ)$^{38}$Cl | $^{38}$Cl | 37.2 m | 250 kW |
| Cr | $^{50}$Cr(n,γ)$^{51}$Cr | $^{51}$Cr | 27.7 d | 250 kW |
| Hf | $^{180}$Hf(n,γ)$^{181}$Hf | $^{181}$Hf | 42.4 d | 250 kW |
| Mg | $^{26}$Mg(n,γ)$^{27}$Mg | $^{27}$Mg | 9.46 m | 250 kW |
| Mo | $^{98}$Mo(n,γ)$^{99}$Mo | $^{99}$Mo | 66.0 h | 250 kW |
| Nb | $^{93}$Nb(n,γ)$^{94m}$Nb | $^{94m}$Nb | 6.26 m | 250 kW |
| Ta | $^{181}$Ta(n,γ)$^{182}$Ta | $^{182}$Ta | 114.4 d | 250 kW |
| Ti | $^{50}$Ti(n,γ)$^{51}$Ti | $^{51}$Ti | 5.76 m | 250 kW |
| W | $^{186}$W(n,γ)$^{187}$W | $^{187}$W | 23.7 h | 250 kW |

TABLE 1-continued

Reactions and experimental conditions used for elements during neutron activation.

| V | $^{51}$V(n,γ)$^{52}$V | $^{52}$V | 3.75 m | 250 kW |
| Zr | $^{96}$Zr(n,γ)$^{97}$Zr | $^{97}$Zr | 16.91 h | 250 kW |

| Elements | Irradiation Time | Waiting Time | Counting Time | Gamma Energy, keV |
|---|---|---|---|---|
| Al | 2 m | 4 m | 4.5 min | 1778.5 |
| Cl | 2 m | 4 m | 4.5 min | 1642.5, 2166.5 |
| Cr | 90 m | 5 h | 1.6 h | 320 |
| Hf | 90 m | 5 h | 1.6 h | 133, 482 |
| Mg | 2 m | 4 m | 4.5 min | 843.8, 1014 |
| Mo | 90 m | 5 h | 1.6 h | 181, 739.7, 141 |
| Nb | 2 m | 4 m | 4.5 min | 871 |
| Ta | 90 m | 5 h | 1.6 h | 1121, 1222 |
| Ti | 2 m | 4 m | 4.5 min | 320 |
| W | 90 m | 5 h | 1.6 h | 135, 481 |
| V | 2 m | 4 m | 4.5 min | 1434 |
| Zr | 90 m | 5 h | 1.6 h | 743.4 |

Molecular Weight Comonomer Distribution Index (MWCDI)

A GPC-IR, high temperature chromatographic system from PolymerChar (Valencia, Spain) was equipped with a Precision Detectors' (Amherst, Mass.) 2-angle laser light scattering detector Model 2040, and an IR5 infra-red detector (GPC-IR) and a 4-capillary viscometer, both from PolymerChar. The "15-degree angle" of the light scattering detector was used for calculation purposes. Data collection was performed using PolymerChar Instrument Control software and data collection interface. The system was equipped with an on-line, solvent degas device and pumping system from Agilent Technologies (Santa Clara, Calif.).

Injection temperature was controlled at 150 degrees Celsius. The columns used, were four, 20-micron "Mixed-A" light scattering columns from Polymer Laboratories (Shropshire, UK). The solvent was 1,2,4-trichlorobenzene. The samples were prepared at a concentration of "0.1 grams of polymer in 50 milliliters of solvent." The chromatographic solvent and the sample preparation solvent each contained "200 ppm of butylated hydroxytoluene (BHT)." Both solvent sources were nitrogen sparged. Ethylene-based polymer samples were stirred gently, at 160 degrees Celsius, for three hours. The injection volume was "200 microliters," and the flow rate was "1 milliliters/minute."

Calibration of the GPC column set was performed with 21 "narrow molecular weight distribution" polystyrene standards, with molecular weights ranging from 580 to 8,400,000 g/mole. These standards were arranged in six "cocktail" mixtures, with at least a decade of separation between individual molecular weights. The standards were purchased from Polymer Laboratories (Shropshire UK). The polystyrene standards were prepared at "0.025 grams in 50 milliliters of solvent" for molecular weights equal to, or greater than, 1,000,000 g/mole, and at "0.050 grams in 50 milliliters of solvent" for molecular weights less than 1,000,000 g/mole. The polystyrene standards were dissolved at 80 degrees Celsius, with gentle agitation, for 30 minutes. The narrow standards mixtures were run first, and in order of decreasing "highest molecular weight component," to minimize degradation. The polystyrene standard peak molecular weights were converted to polyethylene molecular weights using Equation 1B (as described in Williams and Ward, J. Polym. Sci., Polym. Let., 6, 621 (1968)):

$$M\text{polyethylene} = A \times (M\text{polystyrene})^B \quad \text{(Eqn. 1B)},$$

where M is the molecular weight, A has a value of approximately 0.40 and B is equal to 1.0. The A value was adjusted between 0.385 and 0.425 (depending upon specific column-set efficiency), such that NBS 1475A (NIST) linear polyethylene weight-average molecular weight corresponded to 52,000 g/mole, as calculated by Equation 3B, below:

$$Mn(LALS\ gpc) = \frac{\sum_{i=RV_{integration\ start}}^{i=RV_{integration\ end}} (IR_{measurement\ channel_i})}{\sum_{i=RV_{integration\ start}}^{i=RV_{integration\ end}} (IR_{measurement\ channel_i}/M_{PE_i})} \quad \text{(Eqn. 2B)}$$

$$Mw(LALS\ gpc) = \frac{\sum_{i=RV_{integration\ start}}^{i=RV_{integration\ end}} (M_{PE_i} IR_{measurement\ channel_i})}{\sum_{i=RV_{integration\ start}}^{i=RV_{integration\ end}} (IR_{measurement\ channel_i})} \quad \text{(Eqn. 3B)}$$

In Equations 2B and 3B, RV is column retention volume (linearly-spaced), collected at "1 point per second." The IR is the baseline-subtracted IR detector signal, in Volts, from the measurement channel of the GPC instrument, and the $M_{PE}$ is the polyethylene-equivalent MW determined from Equation 1B. Data calculation was performed using "GPC One software (version 2.013H)" from PolymerChar.

A calibration for the IR5 detector ratios was performed using at least ten ethylene-based polymer standards (polyethylene homopolymer and ethylene/octene copolymers; narrow molecular weight distribution and homogeneous comonomer distribution) of known short chain branching (SCB) frequency (measured by the $^{13}$C NMR Method, as discussed above), ranging from homopolymer (0 SCB/1000 total C) to approximately 50 SCB/1000 total C, where total C=carbons in backbone+carbons in branches. Each standard had a weight-average molecular weight from 36,000 g/mole to 126,000 g/mole, as determined by the GPC-LALS processing method described above. Each standard had a molecular weight distribution (Mw/Mn) from 2.0 to 2.5, as determined by the GPC-LALS processing method described above. Polymer properties for the SCB standards are shown in Table A.

TABLE A

"SCB" Standards

| Wt % Comonomer | IR5 Area ratio | SCB/1000 Total C | Mw | Mw/Mn |
|---|---|---|---|---|
| 23.1 | 0.2411 | 28.9 | 37,300 | 2.22 |
| 14.0 | 0.2152 | 17.5 | 36,000 | 2.19 |
| 0.0 | 0.1809 | 0.0 | 38,400 | 2.20 |
| 35.9 | 0.2708 | 44.9 | 42,200 | 2.18 |
| 5.4 | 0.1959 | 6.8 | 37,400 | 2.16 |
| 8.6 | 0.2043 | 10.8 | 36,800 | 2.20 |
| 39.2 | 0.2770 | 49.0 | 125,600 | 2.22 |
| 1.1 | 0.1810 | 1.4 | 107,000 | 2.09 |
| 14.3 | 0.2161 | 17.9 | 103,600 | 2.20 |
| 9.4 | 0.2031 | 11.8 | 103,200 | 2.26 |

The "IR5 Area Ratio (or "IR5$_{Methyl\ Channel\ Area}$/IR5$_{Measurement\ Channel\ Area}$")" of "the baseline-subtracted area response of the IR5 methyl channel sensor" to "the baseline-subtracted area response of IR5 measurement channel sensor" (standard filters and filter wheel as supplied by PolymerChar: Part Number IR5_FWM01 included as part of the GPC-IR instrument) was calculated for each of the "SCB" standards. A linear fit of the SCB frequency versus the "IR5 Area Ratio" was constructed in the form of the following Equation 4B:

$$SCB/1000\text{total}C = A_0 + [A_1 \times (IR5_{Methyl\ Channel\ Area}/IR5_{Measurement\ Channel\ Area})] \quad \text{(Eqn. 4B)},$$

where $A_0$ is the "SCB/1000 total C" intercept at an "IR5 Area Ratio" of zero, and $A_1$ is the slope of the "SCB/1000 total C" versus "IR5 Area Ratio," and represents the increase in the "SCB/1000 total C" as a function of "IR5 Area Ratio."

A series of "linear baseline-subtracted chromatographic heights" for the chromatogram generated by the "IR5 methyl channel sensor" was established as a function of column elution volume, to generate a baseline-corrected chromatogram (methyl channel). A series of "linear baseline-subtracted chromatographic heights" for the chromatogram generated by the "IR5 measurement channel" was established as a function of column elution volume, to generate a base-line-corrected chromatogram (measurement channel).

The "IR5 Height Ratio" of "the baseline-corrected chromatogram (methyl channel)" to "the baseline-corrected chromatogram (measurement channel)" was calculated at each column elution volume index (each equally-spaced index, representing 1 data point per second at 1 ml/min elution) across the sample integration bounds. The "IR5 Height Ratio" was multiplied by the coefficient $A_1$, and the coefficient $A_0$ was added to this result, to produce the predicted SCB frequency of the sample. The result was converted into mole percent comonomer, as follows in Equation 5B:

$$\text{Mole Percent Comonomer} = \{SCB_f/[SCB_f + ((1000 - SCB_f * \text{Length of comonomer})/2)]\} * 100 \quad \text{(Eqn. 5B)},$$

where "$SCB_f$" is the "SCB per 1000 total C", and the "Length of comonomer"=8 for octene, 6 for hexene, and so forth.

Each elution volume index was converted to a molecular weight value ($Mw_i$) using the method of Williams and Ward (described above; Eqn. 1B). The "Mole Percent Comonomer (y axis)" was plotted as a function of $Log(Mw_i)$, and the slope was calculated between $Mw_i$ of 15,000 and $Mw_i$ of 150,000 g/mole (end group corrections on chain ends were omitted for this calculation). An EXCEL linear regression was used to calculate the slope between, and including, $Mw_i$ from 15,000 to 150,000 g/mole. This slope is defined as the molecular weighted comonomer distribution index (MWCDI=Molecular Weighted Comonomer Distribution Index).

Dynamic Mechanical Spectroscopy (DMS)

Resins were compression-molded into "3 mm thick×1 inch" circular plaques at 350° F., for five minutes, under 1500 psi pressure, in air. The sample was then taken out of the press, and placed on a counter to cool.

A constant temperature frequency sweep was performed using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of "2 mm," the sample trimmed (extra sample that extends beyond the circumference of the "25 mm diameter" plate was removed), and then the test was started. The method had an additional five minute delay built in, to allow for temperature equilibrium. The experiments were performed at 190° C. over a frequency range of 0.1 to 100 rad/s. The strain amplitude was constant at 10%. The complex viscosity $\eta^*$, tan ($\delta$) or tan delta, viscosity at 0.1 rad/s (V0.1), the viscosity at 100 rad/s (V100), and the viscosity ratio (V0.1/V100) may be calculated from these data.

Crystallization Elution Fractionation (CEF) Method

The Crystallization Elution Fractionation (CEF) technology is conducted according to Monrabal et al, Macromol. Symp. 257, 71-79 (2007). The CEF instrument is equipped with an IR-4 or IR-5 detector (such as that sold commercially from PolymerChar, Spain) and a two angle light scattering detector Model 2040 (such as those sold commercially from Precision Detectors). A 10 micron guard column of 50 mm×4.6 mm (such as that sold commercially from PolymerLabs) is installed before the IR-4 or IR-5 detector in the detector oven. Ortho-dichlorobenzene (ODCB, 99% anhydrous grade) and 2,5-di-tert-butyl-4-methylphenol (BHT) (such as commercially available from Sigma-Aldrich) are obtained. Silica gel 40 (particle size 0.2-0.5 mm) (such as commercially available from EMD Chemicals) is also obtained. The silica gel is dried in a vacuum oven at 160° C. for at least two hours before use. ODCB is sparged with dried nitrogen ($N_2$) for one hour before use. Dried nitrogen is obtained by passing nitrogen at <90 psig over $CaCO_3$ and 5 Å molecular sieves. ODCB is further dried by adding five grams of the dried silica to two liters of ODCB or by pumping through a column or columns packed with dried silica between 0.1 ml/min to 1.0 ml/min. Eight hundred milligrams of BHT are added to two liters of ODCB if no inert gas such as $N_2$ is used in purging the sample vial. Dried ODCB with or without BHT is hereinafter referred to as "ODCB-m." A sample solution is prepared by, using the autosampler, dissolving a polymer sample in ODCB-m at 4 mg/ml under shaking at 160° C. for 2 hours. 300 μL of the sample solution is injected into the column. The temperature profile of CEF is: crystallization at 3° C./min from 110° C. to 30° C., thermal equilibrium at 30° C. for 5 minutes (including Soluble Fraction Elution Time being set as 2 minutes), and elution at 3° C./min from 30° C. to 140° C. The flow rate during crystallization is 0.052 ml/min. The flow rate during elution is 0.50 ml/min. The IR-4 or IR-5 signal data is collected at one data point/second.

The CEF column is packed with glass beads at 125 μm±6% (such as those commercially available with acid wash from MO-SCI Specialty Products) with ⅛ inch stainless tubing according to U.S. Pat. No. 8,372,931. The internal liquid volume of the CEF column is between 2.1 ml and 2.3 ml. Temperature calibration is performed by using a mixture of NIST Standard Reference Material linear polyethylene 1475a (1.0 mg/ml) and Eicosane (2 mg/ml) in ODCB-m. The calibration consists of four steps: (1) calculating the delay volume defined as the temperature offset between the measured peak elution temperature of Eicosane minus 30.00° C.; (2) subtracting the temperature offset of the elution temperature from the CEF raw temperature data. It is noted that this temperature offset is a function of experimental conditions, such as elution temperature, elution flow rate, etc.; (3) creating a linear calibration line transforming the elution temperature across a range of 30.00° C. and 140.00° C. such that NIST linear polyethylene 1475a has a peak temperature at 101.00° C., and Eicosane has a peak temperature of 30.00° C., (4) for the soluble fraction measured isothermally at 30° C., the elution temperature is extrapolated linearly by using the elution heating rate of 3° C./min. The reported elution peak temperatures are obtained such that the observed comonomer content calibration curve agrees with those previously reported in U.S. Pat. No. 8,372,931.

Comonomer Distribution Breadth Index (CDBI)

The CDBI is calculated using the methodology described in WO/93/03093 from data obtained from CEF. CDBI is defined as the weight percent of the polymer molecules having a comonomer content within 50 percent of the median total molar comonomer content. It represents a comparison of the comonomer distribution in the polymer to the comonomer distribution expected for a Bernoullian distribution.

CEF is used to measure the short chain branching distribution (SCBD) of the polyolefin. A CEF molar comonomer content calibration is performed using 24 reference materials (e.g., polyethylene octene random copolymer and ethylene butene copolymer) with a narrow SCBD having a comonomer mole fraction ranging from 0 to 0.108 and a Mw from 28,400 to 174,000 g/mole. The ln (mole fraction of ethylene), which is the ln (comonomer mole fraction), versus 1/T (K) is obtained, where T is the elution temperature in Kelvin of each reference material. The comonomer distribution of the reference materials is determined using 13C NMR analysis in accordance with techniques described, for example, in U.S. Pat. No. 5,292,845 (Kawasaki, et al.) and by J. C. Randall in Rev. Macromol. Chem. Phys., C29, 201-317.

Film Testing Methods

The following physical properties were measured on the films produced (see experimental section).

45°/60° Gloss

The films may be measured according to ASTM D-2457, and expressed in gloss units.

Total Haze and Internal Haze

Samples measured for internal haze and overall (total) haze were sampled and prepared according to ASTM D1003. Internal haze was obtained via refractive index matching using mineral oil on both sides of the films. A Hazeguard Plus (BYK-Gardner USA; Columbia, Md.) was used for testing. Surface haze was determined as the difference between total haze and internal haze. The total haze was reported as the average of five measurements.

Elmendorf Tear Resistance (MD Tear)

The films are measured according to ASTM D1922, type B in the machine direction (MD Tear), and expressed in grams-force. Prior to testing, the film specimen thickness was measured at the sample center. A total of 15 specimens per film direction were tested, and the average tear strength and average thickness reported. The average tear strength was normalized to the average thickness.

Dart Drop Impact Resistance (Dart)

The films are measured according to ASTM D1709, and expressed in grams.

Examples

TABLE 1

Resin descriptions

| | MI dg/min | Density g/cc |
|---|---|---|
| Resin 1 | 0.91 | 0.918 |
| Resin 2 | 0.90 | 0.919 |
| Resin 3 | 0.84 | 0.919 |
| LDPE 501I, available from The Dow Chemical Company (Midland, MI) | 1.9 | 0.922 |
| AGILITY ™ 2001, available from The Dow Chemical Company (Midland, MI) | 0.4 | 0.924 |
| DOWLEX ™ 2038.68G, available from The Dow Chemical Company (Midland, MI) | 1.0 | 0.935 |
| ATTANE ™ 4701G, available from The Dow Chemical Company (Midland, MI) | 0.80 | 0.912 |
| EXCEED ™ 1018, available from ExxonMobil Chemical Company (Houston, TX) | 1.0 | 0.918 |

Production of Resin 1

To approximately 6,718 kg of 0.20 M $MgCl_2$ slurry was added 219 kg of EADC solution (15 wt % in heptanes), followed by agitation for 8 hours. A mixture of $TiCl_4$/$VOCl_3$ (239 Kg and 155 Kg, respectively) at 6% was then added, followed by 275 Kg of a 6% solution of $Zr(TMHD)_4$ in Isopar E. These two additions were performed sequentially within 3 hours of each other. The resulting catalyst premix was aged with agitation for an additional 8 hours prior to use.

The inventive resin 1 was made according to the following procedures: A heterogeneously branched ethylene/α-olefin copolymer is prepared using a multi-constituent catalyst system, as described hereinabove, suitable for (co)polymerizing ethylene and one or more α-olefin comonomers, e.g. 1-hexene, in an adiabatic continuously stirred tank reactor, CSTR, under a solution phase polymerization condition. More specifically for this example the reactor consists of two adiabatic reactors linked together in series, operating under a solution phase polymerization condition. All feed streams are introduced into the first reactor which is a mechanically agitated adiabatic CSTR.

The solvent, e.g. Petrosol D, ethylene monomer, and 1-hexene comonomer reactor feed streams are purified using molecular sieves prior to introduction in the reaction environment. The solvent, ethylene monomer, and 1-hexene comonomer are combined into a single feed stream prior to introduction into the reaction environment and are temperature controlled. The hydrogen is also added to the combined single feed stream prior to introduction into the reaction environment.

The catalyst system is fed to the reaction environment separately from the single feed stream. The catalyst-premix is combined in line to the reactor with a dilute stream of tri-ethyl aluminum, TEA. The TEA flow is controlled to achieve a specified molar ratio of Al to Ti with the catalyst premix. The catalyst-premix is flow controlled to control the extent of reaction in the reaction environment.

The first reactor temperature and the overall ethylene conversion are controlled by adjusting the catalyst-premix flow and the total solvent flow introduced into the reaction environment. The melt index of the overall polymer is controlled by adjusting the hydrogen feed to the reaction environment. The density of the overall polymer is controlled by adjusting the comonomer feed to the reaction environment. Values for the measured parameters are contained in data Table 2.

After leaving the reaction environment, the reaction is stopped by the addition of and reaction of the active catalyst with a fluid especially designed for that purpose, typically water. The polymer is separated from the solvent and any unreacted monomer, comonomer(s), and hydrogen; the isolated polymer melt is then pelletized and packaged. The separated stream containing solvent, monomer, comonomer(s), and hydrogen is recycled after removal of a purge stream.

TABLE 2

Resin 1 Polymerization Conditions

| Description | Units | Resin 1 |
|---|---|---|
| Reactor Feed (Solvent Mass Flow/Ethylene Mass Flow) | g/g | 4.84 |
| Reactor Feed (Comonomer Mass Flow/Ethylene Mass Flow) | g/g | 0.48 |
| Reactor Feed (Fresh Hydrogen Mass Flow/Ethylene Mass Flow) | g/g | 9.76E−06 |
| Reactor Feed Temperature | ° C. | 14.7 |
| Reactor 1 Temperature | ° C. | 185.1 |
| Reactor 2 Temperature | ° C. | 211.4 |
| Overall Ethylene Conversion | Wt. % | 92.3 |
| Al:Ti molar ratio | mole/mole | 10.5 |
| Ti Catalyst Efficiency | g Poly/g Ti | 1,132,000 |
| Reactor 1 viscosity | cP | 447 |
| Comonomer | Type | 1-hexene |
| Reactor Configuration | Type | Single |

Production of Resin 2

Catalyst 1 is prepared as follows: to approximately 109 kg of 0.20 M $MgCl_2$ slurry was added 7.76 kg of $(C_2H_5)AlCl_2$ (EADC) solution (15 wt. % in heptanes), followed by agitation for 8 hours. A mixture of $TiCl_4/VOCl_3$ (85 mL and 146 mL, respectively) was then added, followed by a solution of $Zr(TMHD)_4$ (Zirconium tetrakis(2,2,6,6-tetramethyl-3,5-heptanedionate) (0.320 kg of a 0.30 M solution in Isopar E). These two additions were performed sequentially within 1 hour of each other. The resulting catalyst premix was aged with agitation for an additional 8 h prior to use. Catalyst 1 is then used to prepare inventive resin 2 as described below.

The polyethylene resins are produced via a solution polymerization according to the following exemplary process. All raw materials (monomer and comonomer) and the process solvent (a narrow boiling range high-purity isoparaffinic solvent, Isopar-E) are purified with molecular sieves before introduction into the reaction environment. Hydrogen is supplied in pressurized cylinders as a high purity grade and is not further purified. The reactor monomer feed stream is pressurized via a mechanical compressor to above reaction pressure. The fresh comonomer is pressurized via a pump and injected into the solvent feed stream to the reactor. The solvent and comonomer feed is then pressurized via a pump to above reaction pressure. The individual catalyst components are manually batch diluted to specified component concentrations with purified solvent and pressured to above reaction pressure. All reaction feed flows are measured with mass flow meters and independently controlled with computer automated valve control systems.

The continuous solution polymerization reactor consists of a liquid full, non-adiabatic, isothermal, circulating, loop reactor which mimics a continuously stirred tank reactor (CSTR) with heat removal. Independent control of all fresh solvent, monomer, comonomer, hydrogen, and catalyst component feeds is possible. The total fresh feed stream to the reactor (solvent, monomer, comonomer, and hydrogen) is temperature controlled by passing the feed stream through a heat exchanger. The total fresh feed to the polymerization reactor is injected into the reactor at two locations with approximately equal reactor volumes between each injection location. The fresh feed is controlled with each injector receiving half of the total fresh feed mass flow. The catalyst components are injected into the polymerization reactor through a specially designed injection stinger and are combined into one mixed catalyst/cocatalyst feed stream prior to injection into the reactor. The primary catalyst component feed is computer controlled to maintain the reactor monomer concentration at a specified target. The cocatalyst component is fed based on calculated specified molar ratio to the primary catalyst component. Immediately following each fresh injection location (either feed or catalyst), the feed streams are mixed with the circulating polymerization reactor contents with static mixing elements. The contents of the reactor are continuously circulated through heat exchangers responsible for removing much of the heat of reaction and with the temperature of the coolant side responsible for maintaining an isothermal reaction environment at the specified temperature. Circulation around the reactor loop is provided by a positive displacement pump.

The final reactor effluent enters a zone where it is deactivated with the addition of and reaction with water. At this same reactor exit location other additives may also be added (such as an acid scavenging agent and anti-oxidants). The stream then goes through a static mixer to disperse the post reactor additive components.

Following catalyst deactivation and additive addition, the reactor effluent enters a devolatization system where the polymer is removed from the non-polymer stream. The isolated polymer melt is pelletized and collected. The non-polymer stream passes through various pieces of equipment which separate most of the ethylene which is removed from the system. Most of the solvent and unreacted comonomer is recycled back to the reactor after passing through a purification system. A small amount of solvent and comonomer is purged from the process. Table 3 summarizes the polymerization conditions for the Inventive Polyethylene Compositions (IE).

TABLE 3

Resin 2 Polymerization Conditions

| Sample | | Resin 2 |
|---|---|---|
| Reactor Configuration | Type | Single |
| Comonomer type | Type | 1-octene |
| Reactor Feed Solvent/Ethylene Mass Flow Ratio | g/g | 3.4 |
| Reactor Feed Comonomer/Ethylene Mass Flow Ratio | g/g | 0.63 |
| Reactor Feed Hydrogen/Ethylene Mass Flow Ratio | g/g | 1.0E−04 |
| Reactor Temperature | ° C. | 175 |
| Reactor Pressure | barg | 50 |
| Reactor Ethylene Conversion | % | 92.0 |
| Reactor Catalyst Type | Type | Catalyst 1 |
| Reactor Co-Catalyst Type | Type | TEA* |
| Reactor Co-Catalyst to Catalyst Molar Ratio (Al to Ti ratio) | Ratio | 12.0 |
| Reactor Residence Time | Min | 6.4 |

*TEA is tri-ethyl-aluminum.

Production of Resin 3

Resin 3 was prepared, via solution polymerization, in a dual series loop reactor system according to U.S. Pat. No. 5,977,251 (see FIG. 2 of this patent), in the presence of a first catalyst system, as described below, in the first reactor, and a second catalyst system, as described below, in the second reactor.

The first catalyst system comprised a bis((2-oxoyl-3-(dibenzo-1H-pyrrole-1-yl)-5-(methyl)phenyl)-2-phenoxymethyl)-methylene-1,2-cyclohexanediylhafnium (IV) dimethyl, represented by the following formula (CAT 1):

(CAT 1)

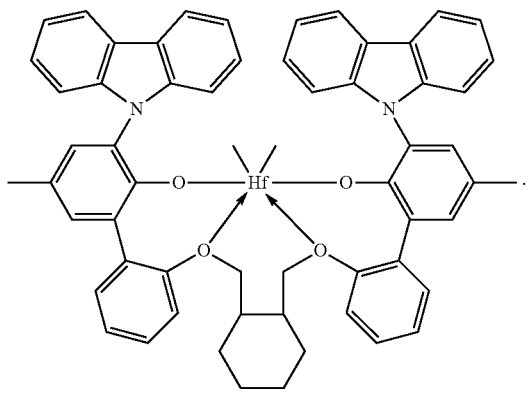

The molar ratios of the metal of CAT 1, added to the polymerization reactor, in-situ, to that of Cocat1 (modified methyl aluminoxane), or Cocat2 (bis(hydrogenated tallow alkyl)methyl, tetrakis(pentafluorophenyl)borate(1-) amine), are shown in Table 4.

The second catalyst system comprised a Ziegler-Natta type catalyst (CAT 2). The heterogeneous Ziegler-Natta type catalyst-premix was prepared substantially according to U.S. Pat. No. 4,612,300, by sequentially adding to a volume of ISOPAR E, a slurry of anhydrous magnesium chloride in ISOPAR E, a solution of $EtAlCl_2$ in heptane, and a solution of $Ti(O-iPr)_4$ in heptane, to yield a composition containing a magnesium concentration of 0.20M, and a ratio of Mg/Al/Ti of 40/12.5/3. An aliquot of this composition was further diluted with ISOPAR-E to yield a final concentration of 500 ppm Ti in the slurry. While being fed to, and prior to entry into, the polymerization reactor, the catalyst premix was contacted with a dilute solution of $Et_3Al$, in the molar Al to Ti ratio specified in Table 4, to give the active catalyst.

The polymerization conditions for Resin 3 are reported in Table 4. As seen in Table 4, Cocat. 1 (modified methyl aluminoxane (MMAO)); and Cocat. 2 (bis(hydrogenated tallow alkyl)methyl, tetrakis(pentafluorophenyl)borate(1-) amine) were used as a cocatalyst for CAT 1. Additional properties of Resin 3 were measured, and are reported in Tables 5A and 5B. Resin 3 was stabilized with minor (ppm) amounts of stabilizers.

TABLE 4

| Polymerization Conditions | | |
|---|---|---|
| Sample # | Units | Resin 3 |
| Reactor Configuration | | Dual Series |
| Comonomer | | 1-octene |
| REACTOR FEEDS | | |
| First Reactor Total Solvent Flow | lb/hr | 814 |
| First Reactor Total Ethylene Flow | lb/hr | 175 |

TABLE 4-continued

| Polymerization Conditions | | |
|---|---|---|
| Sample # | Units | Resin 3 |
| First Reactor Total Comonomer Flow | lb/hr | 62 |
| First Reactor Hydrogen Feed Flow | SCCM | 3276 |
| Second Reactor Total Solvent Flow | lb/hr | 400 |
| Second Reactor Total Ethylene Flow | lb/hr | 180 |
| Second Reactor Total Comonomer Flow | lb/hr | 11 |
| Second Reactor Hydrogen Feed Flow | SCCM | 1782 |
| REACTION | | |
| First Reactor Control Temperature | ° C. | 160 |
| First Reactor Ethylene Conversion | % | 90.9 |
| First Reactor Viscosity | cP | 4361 |
| Second Reactor Control Temperature | ° C. | 195 |
| Second Reactor Ethylene Conversion | % | 86.4 |
| Second Reactor Viscosity | cP | 1548 |
| CATALYST | | |
| First Reactor Catalyst | type | CAT 1 |
| First Reactor Catalyst Efficiency | g polymer per g catalyst metal | 907560 |
| First Reactor Cocatalyst (Cocat. 2) to Catalyst Metal Molar Ratio | Ratio | 1.2 |
| First Reactor Cocatalyst (Cocat. 1) to Catalyst Metal Molar Ratio | Ratio | 50.0 |
| Second Reactor Catalyst Efficiency | g polymer per g catalyst metal | 458017 |
| Second Reactor Al to Ti Molar Ratio | Ratio | 4.0 |

*solvent = ISOPAR E

TABLE 5A

| Measured Properties of the Resins | | | | |
|---|---|---|---|---|
| | Unit | Resin 1 | Resin 2 | Resin 3 |
| Density | g/cc | 0.918 | 0.919 | 0.919 |
| $I_2$ | g/10 min | 0.91 | 0.90 | 0.84 |
| $I_{10}/I_2$ | | 6.5 | 7.3 | 8.1 |
| 7.0 − 1.2 × log(I2) | | 7.0 | 7.1 | 7.1 |
| Mn (conv.gpc) | g/mol | 35,127 | 32,416 | 33,304 |
| Mw (conv.gpc) | g/mol | 122,811 | 119,968 | 116,005 |
| Mz (conv.gpc) | g/mol | 376,444 | 396,896 | 268,386 |
| Mw/Mn (conv.gpc) | | 3.50 | 3.70 | 3.48 |
| Mz/Mw (conv.gpc) | | 3.06 | 3.31 | 2.31 |
| Eta* (0.1 rad/s) | Pa · s | 9,214 | 8,913 | 10,755 |
| Eta* (1.0 rad/s) | Pa · s | 7,571 | 7,065 | 7,842 |
| Eta* (10 rad/s) | Pa · s | 4,758 | 4,368 | 4,508 |
| Eta* (100 rad/s) | Pa · s | 1,956 | 1,801 | 1,723 |
| Eta*0.1/Eta*100 | | 4.71 | 4.95 | 6.24 |
| Eta zero | Pa · s | — | — | 13,821 |
| MWCDI | | — | — | 2.59 |
| CDBI | % | 47.1 | 45.7 | — |
| Vinyls | per 1000 total carbon atoms | 0.21 | 0.25 | — |
| ZSVR | | — | — | 1.97 |

TABLE 5B

Measured Properties of the Resins

| | Unit | DOWLEX™ 2038.68G | AGILITY™ 2001 | ATTANE™ 4701G | EXCEED™ 1018 |
|---|---|---|---|---|---|
| Density | g/cc | 0.935 | 0.924 | 0.912 | 0.9191 |
| $I_2$ | g/10 min | 1.0 | 0.4 | 0.80 | 0.95 |
| $I_{10}/I_2$ | | 7.7 | — | 8.25 | 6.0 |
| $7.0 - 1.2 \times \log(I2)$ | | 7.0 | 7.5 | 7.1 | 7.0 |
| Mn (conv.gpc) | g/mol | 29,100 | — | 29,899 | 45,645 |
| Mw (conv.gpc) | g/mol | 117,400 | — | 114,172 | 109,931 |
| Mz (conv.gpc) | g/mol | 345,100 | — | 259,175 | 197,425 |
| Mw/Mn (conv.gpc) | | 4.03 | — | 3.8 | 2.41 |
| Mz/Mw (conv.gpc) | | 2.93 | — | 2.27 | 1.80 |
| Eta* (0.1 rad/s) | Pa·s | 8,140 | — | 12,384 | 6,975 |
| Eta* (1.0 rad/s) | Pa·s | 6,467 | — | 8,267 | 6,472 |
| Eta* (10 rad/s) | Pa·s | 3,929 | — | 4,662 | 5,071 |
| Eta* (100 rad/s) | Pa·s | 1,603 | — | 1,760 | 2,415 |
| Eta*0.1/Eta*100 | | 5.07 | — | 7.04 | 2.89 |
| Eta zero | Pa·s | — | — | — | 7,748 |
| MWCDI | | — | — | — | −0.06 |
| CDBI | % | — | — | — | 61.1 |
| Vinyls | per 1000 total carbon atoms | — | — | — | 69 |
| ZSVR | | — | — | — | 1.35 |

Multilayer Blown Films 3-layer blown films (Inventive Films 1-3 and Comparative Films 1-10), 1 mil film thickness, were produced having an A/B/A structure with the A layer and B layer further outlined below in Table 6. The 3-layer blown films were produced using a seven layer Alpine blown film line with seven 50 mm extruders, 30/1 L/D grooved feed extruders, moderate shear barrier screws with mixing section. The film fabrication conditions were as follows: blow up ratio (BUR) of 2.5; die gap of 78.7 mils; a die size of 9.84 inches (250 mm), a draw down ratio of 31.4, and a frost line height (FLH) 36 inches. Film properties are reported in Table 6.

TABLE 6

Film Structures & Measured Film Properties

| Films | | Layer Ratio A/B/A | Dart g | MD Tear gf | 45° Gloss GU | Total Haze % |
|---|---|---|---|---|---|---|
| Comp. Film 1 | Resin 3 | [100] | 1260 | 244 | 36 | 17.4 |
| Comp. Film 2 | Resin 1 | [100] | 571 | 510 | 58 | 7.8 |
| Comp. Film 3 | ATTANE™ 4701G | [100] | 1520 | 242 | 46 | 10.7 |
| Comp. Film 4 | Resin 3/Resin 1/Resin 3 | [10/80/10] | 766 | 384 | 35 | 20.1 |
| Inv. Film 1 | Resin 1/Resin 3/Resin 1 | [20/60/20] | 1610 | 283 | 82 | 3.9 |
| Comp. Film 5 | Resin 1/ATTANE™ 4701G/Resin 1 | [20/60/20] | 1070 | 291 | 59 | 7.8 |
| Comp. Film 6 | Resin 1/EXCEED™ 1018/Resin 1 | [20/60/20] | 919 | 288 | 55 | 10 |
| Comp. Film 7 | Resin 3/Resin 1/Resin 3 | [20/60/20] | 1250 | 332 | 39 | 16.4 |
| Inv. Film 2 | Resin 1/Resin 3/Resin 1 | [30/40/30] | 1577 | 273 | 86 | 3.2 |
| Comp. Film 8 | Resin 1/ATTANE™ 4701G/Resin 1 | [30/40/30] | 1260 | 270 | 59 | 7.6 |
| Comp. Film 9 | Resin 3/Resin 1/Resin 3 | [30/40/30] | 1530 | 291 | 43 | 15.2 |
| Inv. Film 3 | Resin 1/Resin 3/Resin 1 | [40/20/40] | 958 | 282 | 88 | 3.1 |
| Comp. Film 10 | Resin 1/ATTANE™ 4701G/Resin 1 | [40/20/40] | 754 | 300 | 58 | 7.1 |

Inventive multilayer blown films 4 & 5 were produced having an A/B/A structure as further outlined below in Table 7. The films were made according to the same process as inventive films 1-3. Film properties are reported in Table 7.

TABLE 7

Film Structures & Measured Film Properties

| Films | | Layer Ratio A/B/A | 45° Gloss GU | Total Haze % |
|---|---|---|---|---|
| Inv. Film 4 | Resin 1/Resin 3/Resin 1 | [30/40/30] | 85 | 3.6 |
| Inv. Film 5 | Resin 1/Resin 3/Resin 1 | [15/70/15] | 85.5 | 3.6 |

As seen in the tables, inventive films 1-5 show significantly lower total haze and/or higher gloss than the comparative films having the same layer ratio thickness. For inventive films 1-3, higher toughness (as indicated by dart drop impact values) can be observed as compared to the comparative films having the same layer ratio thickness.

5-layer blown films (Inventive Film 6 and Comparative Film 11), having a 1.25 mil film thickness, were produced having an A/B/C/D/E structure with the layers further outlined below in Table 8. The 5-layer blown films were produced using a five layer Windmöler & Hölscher (W&H) blown film line with five extruders. The film fabrication conditions were as follows: blow up ratio (BUR) of 2:1; die gap of 70.8 mils; a die size of 13.80 inches (350 mm); a draw down ratio of 27.0, and a line speed of 190 kg/hr. Film properties are reported in Table 8.

TABLE 8

Film Structures & Measured Film Properties

| | Film Layers | | | | | MD Tear (gf) | Total Haze (%) | Gloss 45°/60° (GU) |
|---|---|---|---|---|---|---|---|---|
| | A (25%) | B (10%) | C (30%) | D (10%) | E (25%) | | | |
| Comp. Film 11 | AGILITY™ 2001 | Resin 3 | 75% DOWLEX™ 2038.68 + 25% LDPE 501I | Resin 3 | 75% DOWLEX™ 2038.68 + 25% LDPE 501I | 127 | 11.90 | 52.9/85.3 |
| Inv. Film 6 | 70% Resin 2 + 30% LDPE 501I | Resin 3 | 75% DOWLEX™ 2038.68 + 25% LDPE 501I | Resin 3 | 70% Resin 2 + 30% LDPE 501I | 164.2 | 7.36 | 70.3/109.2 |

As shown above, inventive film 6 also exhibits reduced total haze and increased gloss than comparative film 11. There is also an improvement in MD tear properties.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, if any, including any cross-referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A multilayer blown film having an inner layer, a first outer layer, and a second outer layer, wherein:
   the inner layer comprises an ethylene-based composition comprising at least one ethylene-based polymer, wherein the ethylene-based composition has a MWCDI value greater than 0.9, and a melt index ratio ($I_{10}/I_2$) that meets the following equation: $I_{10}/I_2 > 7.0 - 1.2 \times \log(I_2)$; and
   the first outer layer and the second outer layer independently comprise a polyethylene composition which comprises the reaction product of ethylene and, optionally, one or more alpha olefin comonomers, wherein the polyethylene composition is characterized by the following properties:
   (a) a melt index, $I_2$, of from 0.1 to 2.0 g/10 min;
   (b) a density of from 0.910 to 0.930 g/cc;
   (c) a melt flow ratio, $I_{10}/I_2$, of from 6.0 to 7.6; and
   (d) a molecular weight distribution, (Mw/Mn) of from 2.5 to 4.0; and
   wherein the film exhibits a total haze of less than 12% for a blown film having a thickness of 1 mil.

2. The film of claim 1, wherein the ethylene-based composition has a MWCDI value of less than or equal to 10.0.

3. The film of claim 1, wherein the ethylene-based composition has a ZSVR value of from 1.2 to 3.0.

4. The film of claim 1, wherein the ethylene-based composition has a melt index ratio ($I_{10}/I_2$) of less than or equal to 9.2.

5. The film of claim 1, wherein the ethylene-based composition has a vinyl unsaturation level of greater than 10 vinyls per 1,000,000 total carbons.

6. The film of claim 1, wherein the ethylene-based composition has a density of 0.905 to 0.935 g/cc.

7. The film of claim 1, wherein the inner layer comprises at least 75 wt. %, based on the total amount of polymers in the inner layer, of the ethylene-based composition.

8. The film of claim 1, wherein the polyethylene composition has a vinyl unsaturation of greater than 0.12 vinyls per one thousand carbon atoms.

9. The film of claim 1, wherein the film has a thickness of from 0.3–5 mils.

10. The film of claim 1, wherein the film exhibits a 45° gloss of greater than 65 gloss units.

11. The film of claim 1, wherein the polyethylene composition is formed in the presence of a catalyst composition comprising a multi-metallic procatalyst via solution polymerization in at least one reactor.

12. The film of claim 11, wherein the solution polymerization occurs in a single reactor.

* * * * *